US008739163B2

(12) United States Patent
Ceze et al.

(10) Patent No.: US 8,739,163 B2
(45) Date of Patent: *May 27, 2014

(54) CRITICAL PATH DETERMINISTIC EXECUTION OF MULTITHREADED APPLICATIONS IN A TRANSACTIONAL MEMORY SYSTEM

(75) Inventors: Luis Ceze, Seattle, WA (US); Mark H. Oskin, Seattle, WA (US); Joseph Luke Devietti, Camarillo, CA (US); Brandon Michael Lucia, Seattle, WA (US)

(73) Assignee: University of Washington, Seattle, WA (US)

( * ) Notice: Subject to any disclaimer, the term of this patent is extended or adjusted under 35 U.S.C. 154(b) by 960 days.

This patent is subject to a terminal disclaimer.

(21) Appl. No.: 12/402,395

(22) Filed: Mar. 11, 2009

(65) Prior Publication Data
US 2009/0235262 A1  Sep. 17, 2009

Related U.S. Application Data

(60) Provisional application No. 61/035,490, filed on Mar. 11, 2008.

(51) Int. Cl.
*G06F 9/46* (2006.01)
*G06F 13/00* (2006.01)

(52) U.S. Cl.
USPC .......................................... 718/100; 711/147

(58) Field of Classification Search
None
See application file for complete search history.

(56) References Cited

U.S. PATENT DOCUMENTS

| 5,909,559 | A  | 6/1999  | So          |
| 6,101,524 | A  | 8/2000  | Choi et al. |
| 6,298,370 | B1 | 10/2001 | Tang et al. |
| 6,625,635 | B1 | 9/2003  | Elnozahy    |
| 6,832,367 | B1 | 12/2004 | Choi et al. |
| 8,453,120 | B2 | 5/2013  | Ceze et al. |
| 2003/0069920 | A1 | 4/2003 | Melvin     |

(Continued)

FOREIGN PATENT DOCUMENTS

| WO | WO-01/27764 A1  | 4/2001 |
| WO | WO-02/21281 A2  | 3/2002 |
| WO | WO 2007-056597  | 5/2007 |

OTHER PUBLICATIONS

Harris et al., Transactional Memory: An Overview, IEEE Computer Society (2007).*

(Continued)

*Primary Examiner* — Abdullah Al Kawsar
*Assistant Examiner* — Benjamin Wu
(74) *Attorney, Agent, or Firm* — Perkins Coie LLP

(57) ABSTRACT

A hardware and/or software facility for controlling the order of operations performed by threads of a multithreaded application on a multiprocessing system is provided. The facility may serialize or selectively-serialize execution of the multithreaded application such that, given the same input to the multithreaded application, the multiprocessing system deterministically interleaves operations, thereby producing the same output each time the multithreaded application is executed. The facility divides the execution of the multithreaded application code into two or more quantum specifying a deterministic number of operations, and the facility specifies a deterministic order in which the threads execute the two or more quantum. The deterministic number of operations may be adapted to follow the critical path of the multithreaded application. Specified memory operations may be executed regardless of the deterministic order, such as those accessing provably local data. The facility may provide dynamic bug avoidance and sharing of identified bug information.

22 Claims, 25 Drawing Sheets

(56) References Cited

U.S. PATENT DOCUMENTS

| | | | |
|---|---|---|---|
| 2005/0081103 A1 | 4/2005 | Kadkade | |
| 2005/0081206 A1* | 4/2005 | Armstrong et al. | 718/100 |
| 2005/0108718 A1* | 5/2005 | Kumar et al. | 718/102 |
| 2006/0195821 A1 | 8/2006 | Vanspauwen et al. | |
| 2007/0143755 A1* | 6/2007 | Sahu et al. | 718/100 |
| 2007/0271556 A1 | 11/2007 | Eggers et al. | |
| 2007/0282838 A1* | 12/2007 | Shavit et al. | 707/8 |
| 2008/0120300 A1* | 5/2008 | Detlefs et al. | 707/8 |
| 2008/0120484 A1* | 5/2008 | Zhang et al. | 711/163 |
| 2008/0127035 A1* | 5/2008 | Lev et al. | 717/100 |
| 2008/0162886 A1* | 7/2008 | Saha et al. | 712/214 |
| 2008/0163220 A1* | 7/2008 | Wang et al. | 718/101 |
| 2008/0201712 A1 | 8/2008 | Nottingham et al. | |
| 2008/0209436 A1* | 8/2008 | Agha et al. | 718/106 |
| 2008/0313645 A1* | 12/2008 | Birrell et al. | 719/312 |
| 2009/0019231 A1* | 1/2009 | Cypher et al. | 711/141 |
| 2009/0077329 A1* | 3/2009 | Wood et al. | 711/156 |
| 2009/0077540 A1* | 3/2009 | Zhou et al. | 717/126 |
| 2009/0165006 A1 | 6/2009 | Ceze | |
| 2009/0172306 A1* | 7/2009 | Nussbaum et al. | 711/154 |
| 2011/0283262 A1 | 11/2011 | Ceze et al. | |

OTHER PUBLICATIONS

Bobba et al., Performance Pathologies in Hardware Transactional Memory (2007).*
Larus and Rajwar, Transactional Memory, Synthesis Lectures on Computer Architecture (2007).*
Larus et al., Transactional Memory, Communications of the ACM, Jul. 2008.*
Larus and Rajwar, Transactional Memory (2007).*
Bacon, D. and Goldstein, S., "Hardware-Assisted Replay of Multiprocessor Programs," Workshop on Parallel and Distributed Debugging, 1991, 13 pages.
Bienia, C. et al., "The PARSEC Benchmark Suite: Characterization and Architectural Implications," Princeton University Technical Report, Jan. 2008, pp. 1-22.
Choi, J. and Srinivasan, H., "Deterministic Replay of Java Multithreaded Applications," Sigmetrics Symposium on Parallel and Distributed Tools, Aug. 1998.
Gopal, S. et al., "Speculative Versioning Cache," HPCA, 1998, 11 pages.
Hammond, L. et al, "Data Speculation Support for a Chip Mulitprocessor," ASPLOS, Oct. 1998, pp. 58-69.
Hammond, L et al., "Transactional Memory Coherence and Consistency," International Symposium on Computer Architecture, 2004, 12 pages.
Herlihy, M. and Moss, J., "Transactional Memory: Architectural Support for Lock-Free Data Structures," International Symposium on Computer Architecture, 1993, pp. 289-300.
Hower, D. and Hill, M., "Rerun: Exploiting Episodes for Lightweight Memory Race Recording," International Symposium on Computer Architecture, 2008, pp. 265-276.
Hwu, W. et al., "Implicity Parallel Programming Models for Thousand-Core Microprocessors," DAC, 2007, 6 pages.
International Search Report and Written Opinion; International Patent Application No. PCT/US08/86711; Filed: Dec. 12, 2008; Applicant: University of Washington; Mailed on Jan. 28, 2009.

Krishnan, V. and Torrellas, J., "A Chip-Multiprocessor Architecture with Speculative Multithreading," IEEE Transactions on Computers, vol. 48, No. 9. Sep. 1999, pp. 866-880.
Lattner, C. and Adve, V., "LLVM: A Compilation Framework for Lifelong Program Analysis & Transformation," CGO, 2004, 12 pages.
Leblanc, T. and Mellor-Crummey, J., "Debuggin Parallel Programs with Instant Replay," IEEE Transactions on Computers, vol. C-36, No. 4, Apr. 1987, pp. 471-482.
Lee, Edward, "The Problem with Threads," IEEE Computer, May 2006, pp. 33-42.
Luk, C. et al., "Pin: Building Customized Program Analysis Tools with Dynamic Instrumentation," PLDI, Jun. 2005, pp. 1-11.
Montesinos, P. et al., "DeLorean: Recording and Deterministically Replaying Shared-Memory Multiprocessor Execution Efficiently," International Symposium on Computer Architecture, 2008, pp. 289-300.
Narayanasamy, S. et al., "Recording Shared Memory Dependencies Using Strata," ASPLOS 2006, pp. 229-240.
Narayanasamy, S. et al., "BugNet: Continuously Recording Program Execution for Deterministic Replay Debugging," International Symposium on Computer Architecture, 2005, 12 pages.
Rinard, M. and Lam, M., "The Design, Impelmentation, and Evaluation of Jade," ACM Transactions on Programming Languages and Systems, vol. 20, No. 3, May 1998, pp. 483-545.
Ronsse, M. and De Bosschere, K., "RecPlay: A Fully Integrated Practical Record/Replay System," ACM Transactions on Computer Systems, vol. 17, No. 2, May 1999, pp. 133-152.
Sohi, G. et al., "Multiscalar Processors," International Symposium on Computer Architecture, Jun. 1995, pp. 414-425.
Thies, W. et al., "Streamit: A Language for Streaming Applications," CC, 2002, pp. 1-17.
Woo, S. et al., "The SPLASH-2 Programs: Characterization and Methodological Considerations," International Symposium on Computer Architecture, 1995, pp. 24-36.
Xu, M. et al., "A 'Flight Data Recorder' for Enabling Full-system Multiprocessor Deterministic Replay," International Symposium on Computer Architecture, 2003, 12 pages.
Xu, M. et al., "A Regulated Transitive Reduction (RTR) for Longer Memory Race Recording," ASPLOS, 2006, pp. 49-60.
Devietti, et al. "DMP: Deterministic Shared Memory Multiprocessing", University of Washington, May 2008, 22 pages.
Supplementary European Search Report, European Patent Application No. 08858537.7; Applicant: University of Washington, dated Feb. 4, 2011, 7 pages.
International Search Report and Written Opinion; International Application No. PCT/US09/36860; Filed Mar. 11, 2009; Applicant: University of Washington; Mailed Jul. 2, 2009; 13 pages.
Supplementary European Search Report for Application No. 09719812; mailed Dec. 13, 2011, 11 pages.
Devietti, Joseph et al., "DMP: Deterministic Shared Memory Multiprocessing," Computer Science & Engineering, University of Washington, Proceedings of the 2009 ACM Sigplan Conference on Progrmming Language Design and Implementation, PLDI'09, vol. 44, Mar. 9, 2009, pp. 85-96, SP55013787, New York, New York.
Nettles, Scott M. and Jeannette M. Wing, "Persistence + Undoability = Transactions," School of Computer Science, Carnegie Mellon University, 12 pages, Aug. 30, 1991.
Adl-Tabatabai et al., Compiler and Runtime Support for Efficient Software Transactional Memory (2006), 12 pages.

* cited by examiner

| memory location | shared data | private data |
|---|---|---|
| A | - | thread$_2$ |
| B | thread$_1$; thread$_2$; thread$_6$; | - |
| C | - | thread$_2$ |
| D | thread$_3$; thread$_5$; thread$_6$; | thread$_3$ |
| E | | - |
| ... | | |
| X | - | - |

FIG. 14

CRITICAL PATH DETERMINISTIC EXECUTION OF MULTITHREADED APPLICATIONS IN A TRANSACTIONAL MEMORY SYSTEM

RELATED APPLICATIONS

This application claims priority to U.S. Provisional Patent Application No. 61/035,490 entitled "A METHOD FOR EFFICIENT DETERMINISTIC MULTITHREADING," filed on Mar. 11, 2008, which is hereby incorporated by reference. This application is related to U.S. patent application Ser. No. 12/334,336 entitled "DETERMINISTIC MULTIPROCESSING," filed on Dec. 12, 2008, which claims priority to U.S. Provisional Patent Application No. 61/013,019 entitled "DETERMINISTIC MULTIPROCESSING," filed on Dec. 12, 2007, which are hereby incorporated by reference.

BACKGROUND

Multiprocessing is a mode of operation in which two or more processing units each carry out one or more processes (programs or sets of instructions) in tandem. The objective of a multiprocessing system is to increase processing speed. Typically, this is accomplished by each processing unit operating on a different set of instructions or on different threads of the same process. A process may execute one or more threads. Each thread has it own processor context, including its own program context. Traditionally, for an application to take advantage of the benefits of multiprocessing, a software developer must write the application to be multithreaded. As used herein, a multithreaded application refers to a program capable of running two or more threads simultaneously.

On a multiprocessor or multi-core system (collectively referred to herein as a "multiprocessing system"), two or more of the threads of a multithreaded application may be able to execute at the same time, with each processor or core running a particular thread. It is common for threads of a multithreaded application to share resources during concurrent execution, such as, for example, memory. As used herein, concurrent execution refers to the simultaneous execution of two or more threads of a multithreaded application. A consequence of concurrent execution is that two or more threads of a multithreaded application may read and/or update the same shared resource. For example, one thread may modify a value of a shared memory location while another thread executes a sequence of operations that depend on the value stored in the shared memory location.

Under the traditional software development model, software developers spend a substantial amount of time identifying and attempting to correctly synchronize parallel threads within their multithreaded applications. For example, a developer may explicitly use locks, semaphores, barriers, or other synchronization mechanisms to control access to a shared resource. When a thread accesses the shared resource, the synchronization mechanism prevents other threads from accessing the resource by suspending those threads until the resource becomes available. Software developers who explicitly implement synchronization mechanisms also typically spend a substantial amount of time debugging their synchronization code. However, software defects (referred to as "bugs") resulting from synchronization errors typically manifest themselves transiently (i.e., a bug may appear only on a particular sequence or sequences of interleaved thread operations). As a result, defective software might execute correctly hundreds of times before a subtle synchronization bug appears.

It is difficult to develop software for multiprocessing systems because of the nondeterministic behavior created by the various interleaving of threads on such systems. An interleaving refers to an order of thread operations that may include interaction between threads. The number of possible interleavings between threads significantly increases as the number of threads increase. Consequently, multithreaded applications present additional challenges in terms of error detection and modeling program behavior. For example, given the same input to a multithreaded application, a multiprocessing system will interleave thread operations nondeterministically, thereby producing different output each time the multithreaded application is executed. FIG. 1 is a high-level diagram showing an example of two possible thread interleavings in a multithreaded application executed on a multiprocessing system. As illustrated, the application includes at least two threads: thread 1 and thread 2. When the application is invoked, at some point in time, thread 1 executes an operation settings the value of variable A to one (A=1) followed by an operation settings the value of variable B to the value of variable A (B=A), and thread 2 executes an operation settings the value of variable B to zero (B=0) followed by an operation settings the value of variable A to the value of variable B (A=B). As illustrated, the operations of thread 1 and thread 2 are interleaved nondeterministically, thereby producing different output each time the application is invoked. That is, during the first illustrated invocation, the interleaving of operations resulted in variables A and B each being set to zero, while during the second illustrated invocation, the interleaving of operations resulted in variables A and B each being set to one.

Non-determinism in multithreaded execution may arise from small changes in the execution environment, such as, for example, other processes executing simultaneously, differences in the operating system resource allocation, the state of caches, translation lookaside buffers ("TLBs"), buses, interrupts, and other microarchitectural structures. As a result, developing a multithreaded application is significantly more difficult than developing a single-threaded application.

Conventionally, efforts in addressing this problem have focused on deterministically replaying multithreaded execution based on a previously generated log file. However, deterministic replay systems suffer substantial performance degradation as a result of the overhead associated with maintaining the replay log file. Moreover, with deterministic replay, a software developer does not have control over how the interleaving of threads is performed. As a result, synchronization bugs resulting from particular interleavings of operations may not be identified (and, more importantly, corrected) before the software is deployed to a customer. Non-determinism further complicates the software development process in that non-determinism makes it hard to assess test coverage. Good coverage requires both a wide range of program inputs and a wide range of possible thread interleavings.

BRIEF DESCRIPTION OF THE DRAWINGS

One or more embodiments of the facility are illustrated by way of example and not limitation in the figures of the accompanying drawings, in which like references indicate similar elements and in which:

FIG. 14 is a high level block diagram showing a sharing table in one or more embodiments.

DETAILED DESCRIPTION

Figure 1:
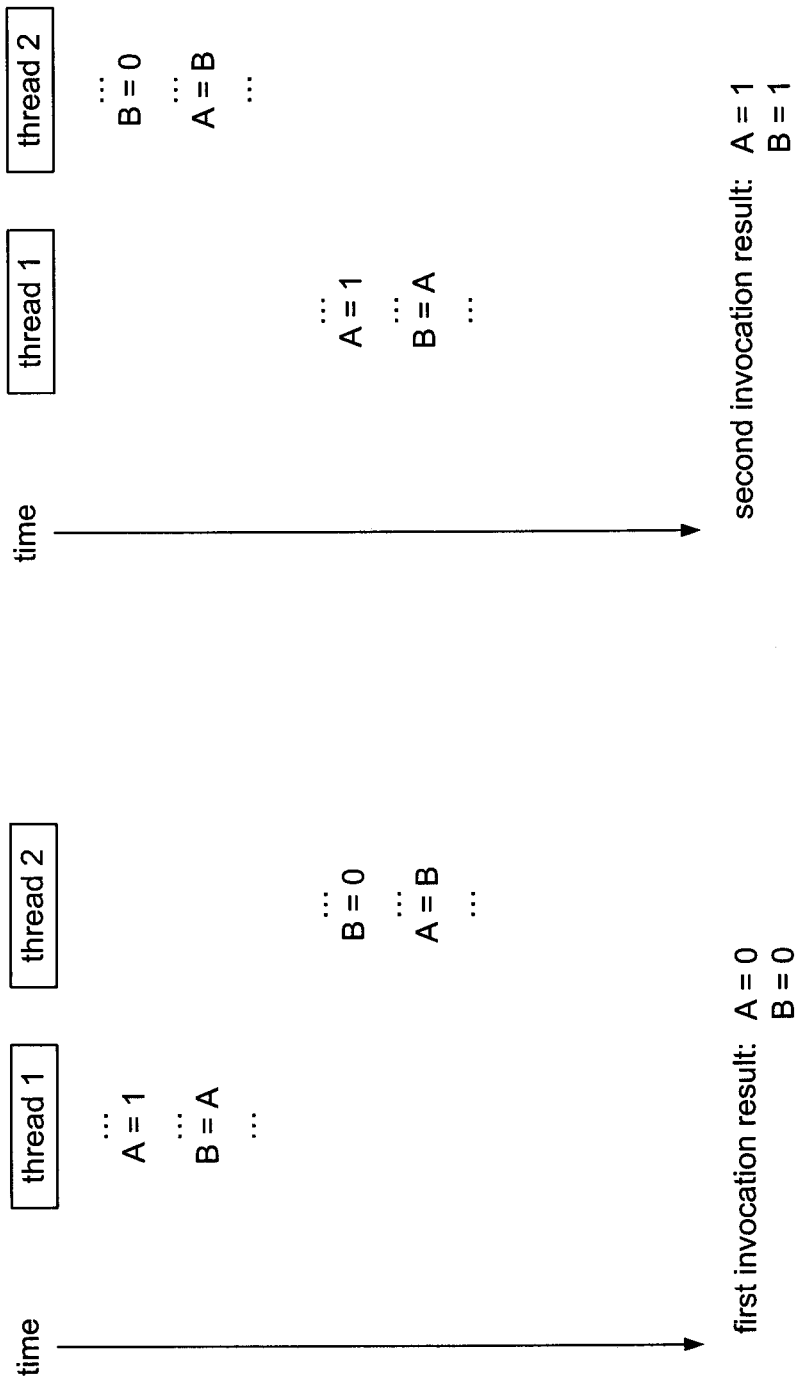
FIG. 1 is a high-level diagram showing an example of two possible thread interleavings in a multithreaded program.

Conventional systems, such as deterministic replay systems, do not adequately resolve the problems associated with the nondeterministic behavior in the development of multithreaded applications. Additionally, no existing systems reduce or attempt to resolve the problems associated with nondeterministic behavior in the deployment of multithreaded applications. Accordingly, a hardware and/or software facility for deterministic multiprocessing of multithreaded applications ("the facility") has been developed. As used herein, the term deterministic multiprocessing refers to a technique by which given the same input to a multithreaded application, the same output is produced by the multithreaded application. The facility simplifies the process of developing multithreaded applications, for example, by freeing developers from the burden of synchronizing thread accesses to shared resources. Additionally, the facility improves the reliability of such multithreaded applications when they are deployed, for example, by enabling developers to reproduce bugs and rigorously test various thread interleavings.

In some embodiments, the facility divides execution of a multithreaded application into sets of a finite, deterministic number of operations (each set is referred to herein as a "quantum"). When identifying quanta, the facility may distinguish between operations that can be performed concurrently, such as communication-free thread operations, and operations that are to be performed in a deterministic order, such as inter-thread communications, system calls, and so on. Each quantum identified by the facility is then performed in a deterministic order. By controlling the order in which quanta are executed by threads of a multithreaded application, the facility enables the multithreaded application to behave deterministically. That is, given the same input, threads of the multithreaded application interleave their operations deterministically, thereby providing the same output. In some embodiments, the quanta size (i.e., the predefined number of operations) varies between threads, while in other embodiments, the quanta size is uniform.

In some embodiments, the facility serializes execution of a multithreaded application. That is, the facility may control the global interleaving of all thread operations. For example, this may be accomplished by establishing a memory access token that is passed in a deterministic order between threads when a quantum boundary is reached. A thread may be referred to as "holding" the token when the value of the token matches the identifier of that thread. When the value of the token does not match the identifier of a thread, its execution is suspended until the value of the token matches the identifier of the thread. When the value of the token matches the identifier of a thread, the thread performs a finite, deterministic number of operations (i.e., a quantum) before the token is passed to the next thread. The token may be passed to the next thread, for example, by advancing the value of the token to correspond to the identifier of the next thread in the deterministic order.

Figure 2:
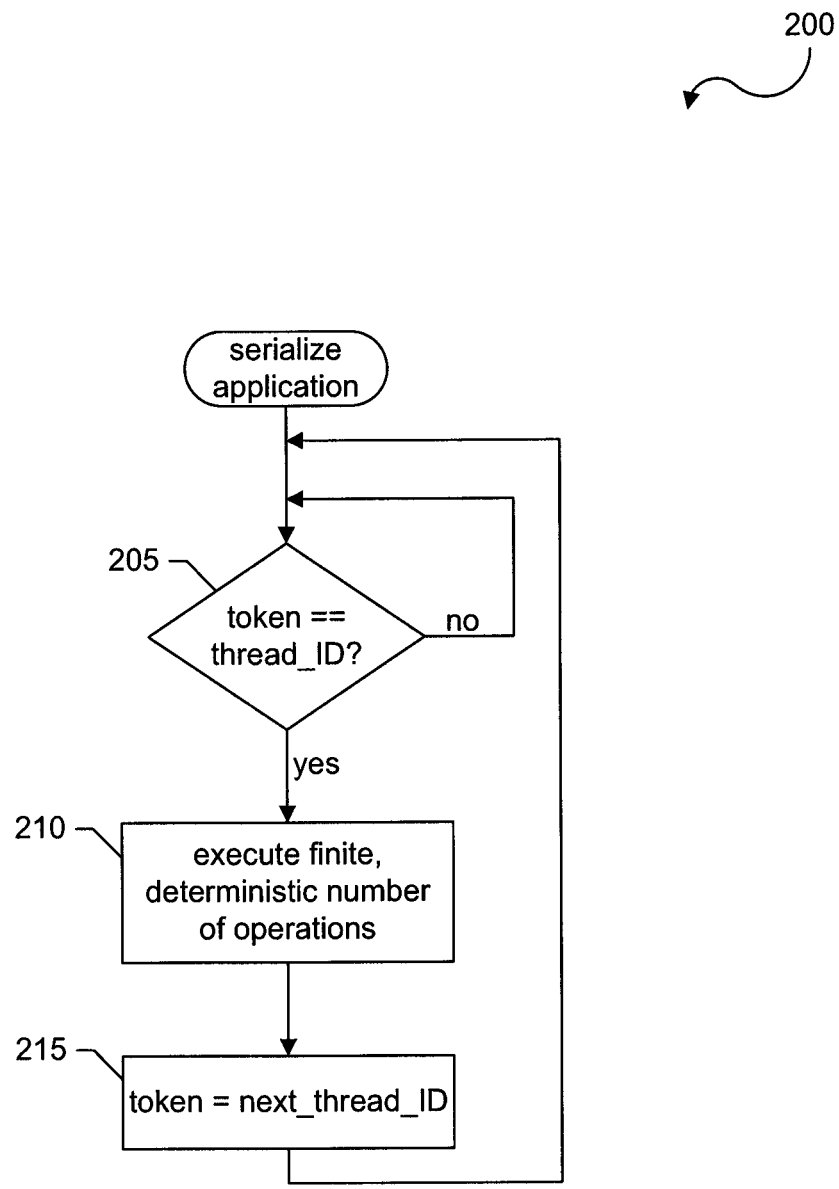
FIG. 2 is a flow diagram of a deterministic serialization process performed by the facility in one or more embodiments.

FIG. 2 is a flow diagram of a deterministic serialization process 200 performed by the facility in one or more embodiments. For example, the deterministic serialization process 200 may be performed while a multithreaded application executes on a multiprocessing system. While the multithreaded application executes, the facility loops through steps 205-215 for each thread. In step 205, if the facility determines that the value of the token matches the identifier of a thread, then the facility continues to step 210, else the facility loops back to step 205. That is, the facility suspends execution of the thread until the value of the token matches the identifier of that thread. In step 210, the facility allows the thread whose identifier matches the token to execute a finite, deterministic number of operations (i.e., a quantum), then the facility continues to step 215. In step 215, the facility sets the value of the token to equal the identifier of the next thread in the deterministic order, then the facility continues to step 205. It is noted that the facility may continue looping through the serialization process 200 until the application exits.

Those skilled in the art will appreciate that the steps shown in FIG. 2 and in each of the following flow diagrams may be altered in a variety of ways. For example, the order of certain steps may be rearranged; certain sub-steps may be performed in parallel; certain shown steps may be omitted; or other steps may be included; etc.

In some embodiments, the facility selectively serializes execution of a multithreaded application. That is, the facility may control the interleaving of certain thread operations (referred to herein as "controlled operations"), while other thread operations are performed concurrently. For example, the facility may control the interleaving of operations that involve communication between two or more threads. Inter-thread communication occurs when a thread reads data that is privately held by another thread or when a thread writes to shared data thereby privatizing it. In some embodiments, when a thread attempts to read data that is regarded as privately held by another thread, the thread suspends its execution until the value of the token matches its identifier and all other threads reach a deterministic point in their execution (e.g., complete execution of a quantum, are blocked, etc.). Similarly, in some embodiments, when a thread attempts to write to data that is shared or regarded as privately held by another thread, it suspends its execution until the value of the token matches its identifier and all other threads reach a deterministic point in their execution. As a result, the facility ensures that all threads observe the change in state of the data (from shared to privately held by the thread) at a deterministic point in their execution.

In some embodiments, to detect inter-thread communication, the facility maintains a shared-memory data structure that includes sharing information for each memory location in the address space of the multithreaded application. For example, such information may indicate that a memory location is shared, private, etc. It is noted that sharing may occur at different levels, such as the operation-level, instruction-level, page-level, and so on. In some embodiments, a thread may access its own privately held data or read shared data without holding the token. However, to write to shared data or to read data that is held as private by another thread, the thread waits until it holds the token and all other threads reach a deterministic point in their execution. When a thread reads a memory location that is regarded as private by another thread, the shared-memory data structure is updated to indicate that the read memory location is to be regarded as shared. When a thread writes to a memory location, the shared-memory data structure is updated to indicate that the memory location is to be regarded as privately held by that thread. Similarly, when a thread reads a memory location that has not been previously accessed by another thread, the shared-memory data structure is updated to indicate that the memory location is to be regarded as privately held by that thread.

In some embodiments, the facility implements a shared-memory data structure as a sharing table. FIG. 14 is a high level block diagram showing a sharing table 1400 in some embodiments. Sharing table 1400 maintains sharing information for each memory location 1405 in the address space of a multithreaded application. It is noted that sharing may occur at different levels, such as the operation-level, instruction-level, page-level, and so on. Sharing table 1400 includes a shared data field 1410 that, for each memory location 1405, identifies two or more threads that have accessed the data stored at that location. For example, in the illustrated embodiment, shared data field 1410 indicates that the data stored at memory location B has been accessed by thread 1, thread 2, and thread 6. Sharing table 1400 includes a private data field 1415 that, for each memory location 1405, identifies the thread for which the data stored at that location is regarded as private. For example, in the illustrated embodiment, private data field 1415 indicates that memory locations A and C store data that is regarded as private to thread 2.

Figure 15:
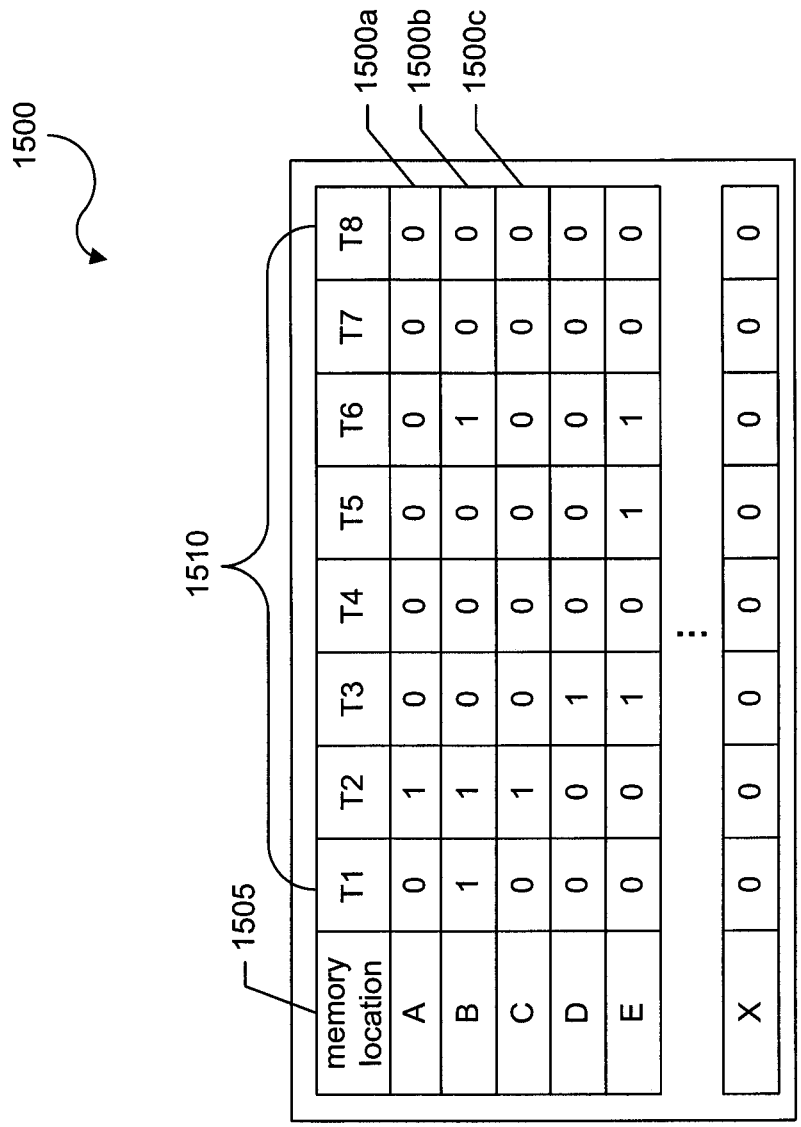
FIG. 15 is a high level block diagram showing masks for each memory location in the address space of a multithreaded application in one or more embodiments.

Those skilled in the art will appreciate that the facility may implement a shared-memory data structure in a variety of forms. For example, in some embodiments, the shared-memory data structure is implemented as a bit mask that, for each memory location, identifies all threads that have accessed that memory location. FIG. 15 is a high level block diagram showing thread masks 1500 for each memory location 1505 in the address space of a multithreaded application in one or more embodiments. A memory location 1505 is regarded as private when its corresponding thread mask 1500 identifies a single thread 1510. For example, memory location A and memory location C are regarded as private to thread 2 because their corresponding masks 1500a and 1500c identify only thread 2. A memory location 1505 is regarded as shared when its corresponding thread mask 1500 identifies two or more thread 1510. For example, memory location B is regarded as shared because its corresponding thread mask 1500b identifies thread 1, thread 2, and thread. It is noted that the number of threads 1510 may vary between applications and/or the states of an application. As such, the example of eight threads, as shown in the illustrated embodiment, should not be taken as restrictive.

Figure 3:
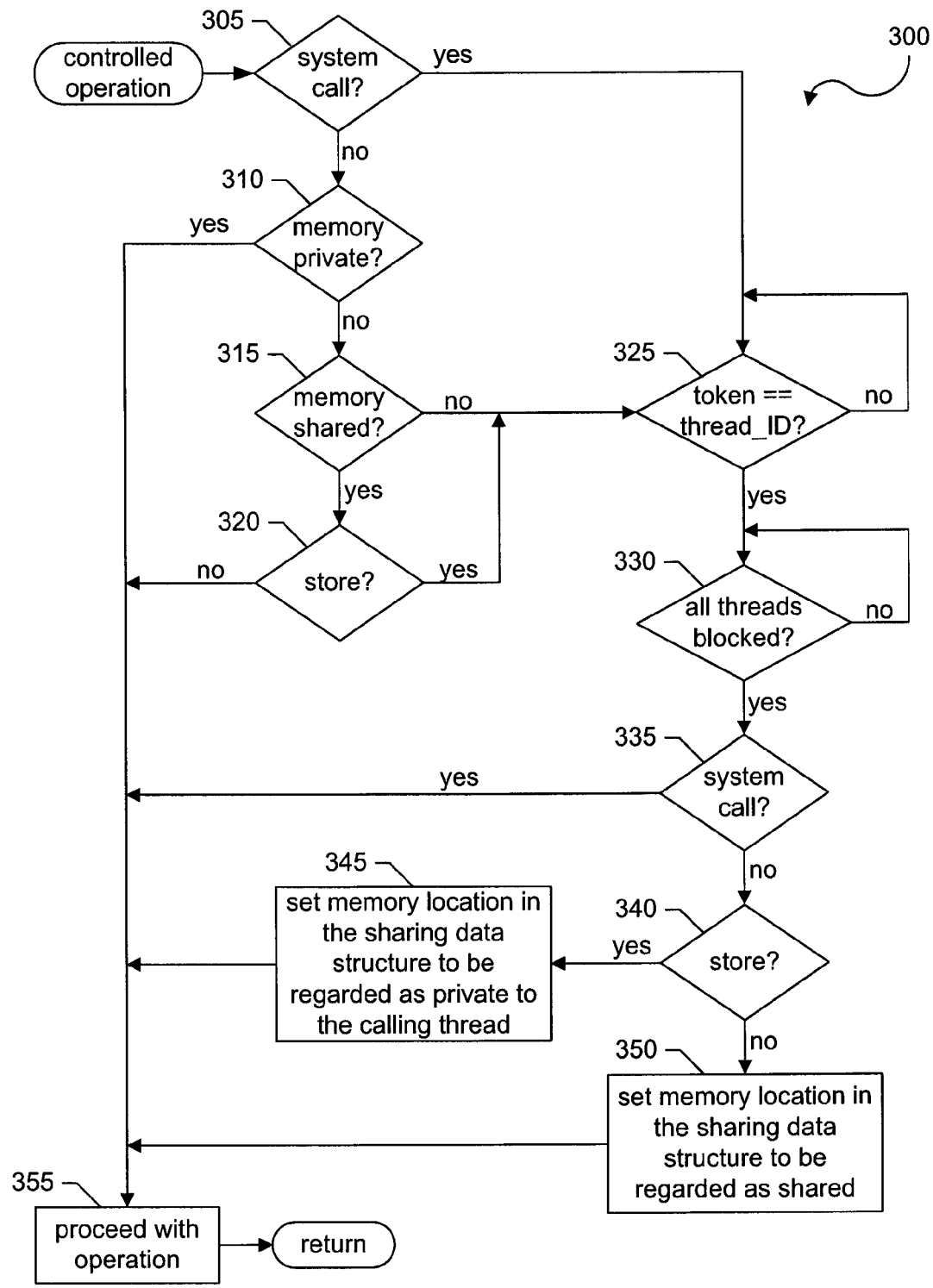
FIG. 3 is a flow diagram of a deterministic selective serialization process performed by the facility in one or more embodiments.

FIG. 3 is a flow diagram of a deterministic selective serialization process 300 performed by the facility in one or more embodiments. For example, the selective serialization process 300 may be performed when a thread or processor attempts to perform a controlled operation, such as memory operations, system calls, etc. In step 305, if the facility determines that the operation is a system call (e.g., an I/O operation, etc.), then facility continues to step 325, else the facility continues to step 310. In step 310, if the facility determines that the operation accesses memory that is not privately held by the thread, then the facility continues to step 315, else the facility continues to step 355. In step 315, if the facility determines that the operation accesses shared memory, then the facility continues to step 320, else the facility continues to step 325. In step 320, if the facility determines that the operation is a store operation, then the facility continues to step 325, else the facility continues to step 355. In step 325, if the facility determines that the value of the token matches the identifier of the thread, then the facility continues to step 330, else the facility loops back to step 325. That is, the facility suspends execution of the selected thread until the value of the token matches the identifier of the selected thread. In step 330, if the facility determines that all threads of the multithreaded application are suspended (or blocked), then the facility continues to step 335, else the facility loops back to step 330. By waiting for all threads to be suspended before the thread holding the token may execute, the facility ensures that, at a deterministic point in their execution, all threads observe any state change that results from execution of the operation. In step 335, if the facility determines that the operation is a system call, then the facility continues to step 355, else the facility continues to step 340. In step 340, if the facility determines that the operation is a store operation, then the facility continues to step 345, else the facility continues to step 350. In step 345, the facility updates the shared memory data structure to indicate that the memory location affected by the operation is to be regarded as privately held by the thread, then the facility continues to step 355. In step 350, the facility updates the shared memory data structure to indicate that the memory location accessed by the operation is to be regarded as shared, then the facility continues to step 355. In step 355, the facility allows the thread to proceed with the operation, then the facility returns.

In some embodiments, the facility operates together with a transactional memory system to serialize or selectively serialize execution of a multithreaded application. For example, the facility may use the transactional memory system to detect inter-thread communication that would violate the deterministic ordering of memory operations. That is, the transactional memory system may be used instead of, or in addition to, the shared-memory data structure. It is noted that the transactional memory system may be a hardware transactional memory (HTM) system, a software transactional memory (STM) system, or a hybrid hardware-software transactional memory system (HS-TM). When operating together with a transactional memory system, the facility encapsulates each quantum executed by a thread within a transaction. By encapsulating each quantum within a transaction, the threads appear to execute atomically and in isolation. As a result, transactions may be executed concurrently, and then committed according to a deterministic order. That is, the TM system commits a transaction when a thread holds the token and, after the transaction is committed, the token is passed to the next thread in the deterministic order. It is noted that, in some embodiments, the facility supports multiple tokens, thereby allowing multiple deterministic processes to execute at the same time, each process specifying a token that is passed between threads within each process. A transaction is typically not committed if the transaction includes an inter-thread communication that would violate the deterministic ordering (referred to herein as a "conflict"). When a conflict exists, the transaction may be aborted and restarted.

Figure 25A:
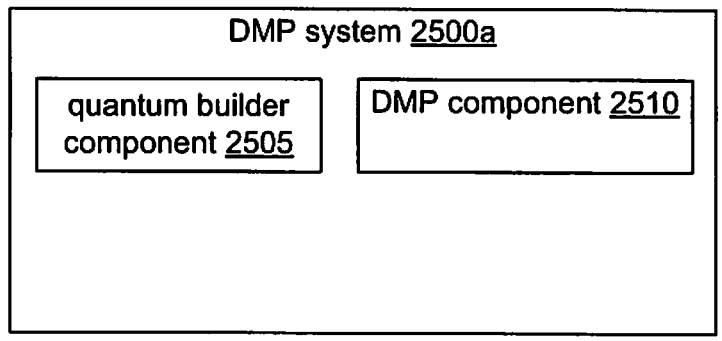
FIGS. 25A-25C are high-level block diagrams showing various functional elements of a deterministic multiprocessing system in one or more embodiments.
Figure 25B:
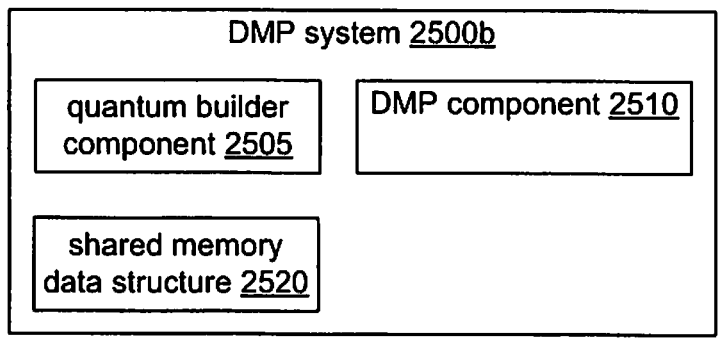
Figure 25C:
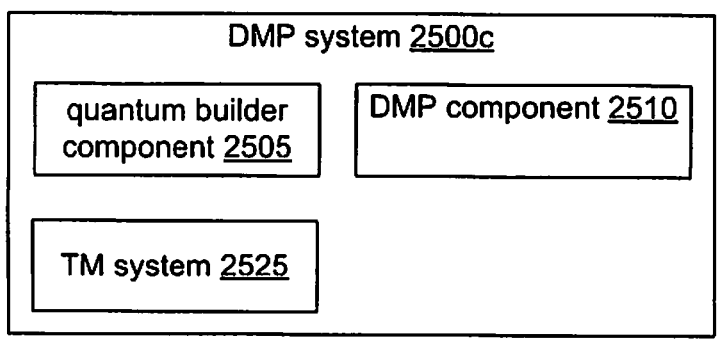

In some embodiments, the facility includes a quantum builder component and a deterministic multiprocessing ("DMP") component. For example, FIGS. 25A-25C are high-level block diagrams showing various functional elements of a deterministic multiprocessing system 2500 in some embodiments. FIG. 25A illustrates a DMP system 2500a that includes a quantum builder component 2505 and a DMP component 2510. The quantum builder component 2505 is used to divide execution of a multithreaded application into quanta (i.e., sets of a finite, deterministic number of operations). In some embodiments, the quantum builder 2505 component distinguishes between operations that may be performed concurrently, such as communication-free thread operations, and operations that are to be performed in a deterministic order (e.g., controlled operations), such as inter-thread communications, system calls, and so on. The DMP component 2510 ensures that each quantum is performed according to a deterministic order. For example, to serialize execution of a multithreaded application, the DMP component 2510 may implement a token that is passed between threads in a deterministic order when a quantum boundary is reached. As another example, to selectively serialize execution of a multithreaded application, the DMP component 2510 may implement a shared-memory data structure that is used to determine whether a thread is permitted to execute an operation without holding the token. FIG. 25B illustrates a DMP system 2500b that includes a shared memory data structure 2520. As yet another example, a transactional memory system may be used instead of, or in addition to, the shared-memory data structure 2520. FIG. 25C illustrates a DMP system 2500c that includes a transactional memory system 2525, which may operate together with the quantum builder component 2505 and the DMP component 2510 to serialize or selectively serialize execution of a multithreaded application. The transactional memory system 2525 may be a hardware transactional memory (HTM) system, a software transactional memory (STM) system, or a hybrid hardware-software transactional memory system (HS-TM).

In some embodiments, when the token is advanced to a thread that is blocked (e.g. waiting for a lock held by another thread), the facility passes the token to the next thread, thereby avoiding livelock resulting from blocking synchronization primitives that a developer included within the multithreaded code. For example, if thread 1 holds a lock that thread 2 requires to proceed at the time that the token is passed to thread 2, then the token is passed to the next thread (e.g., thread 3), and so on. Because the token is passed in a deterministic order, and because each thread executes a quantum (or passes the token), the quanta are interleaved deterministically, thereby preventing livelock and producing the same output each time the code is executed with the same input.

The quantum builder component 2505 and DMP component 2510 may be implemented in hardware, software, or a combination of hardware and software. For example, the quantum builder component 2505 may be implemented by counting instructions as they retire and placing a quantum boundary when the predetermined quantum size is reached. To serialize execution, the DMP component 2510 may be implemented as a token that is passed between processors at a quantum boundary in a deterministic order. As another example, to selectively serialize execution, the quantum builder component 2505 may monitor memory accesses to determine whether an access involves inter-thread communication (e.g., access to shared data, etc.). In one embodiment, the DMP component 2510 uses a cache line state maintained by a MESI ("Modify, Exclusive Share, Invalidate") cache coherence protocol to implement a shared-memory data structure 2520. A cache line in an exclusive or modified state is regarded as privately held by a processor, and can be freely read or written by its owner thread without holding the token. Similarly, a cache line in a shared state may be freely read by its owner thread without holding the token. The processor may write to a cache line in a shared state when all threads are at a deterministic point in their execution (e.g., when all processors are blocked or reach a quantum boundary) and when the processor acquires the deterministic token. In such embodiments, each processor broadcasts when it is blocked and/or when it is unblocked. It is noted that the state of entries in the shared-memory data structure 2520 corresponding to lines that are not cached by any processor may be kept in memory and managed by a memory controller, and that the state of such entries may be transferred when cache misses are serviced.

In some embodiments, the facility may be implemented using a compiler or a binary rewriting infrastructure. For example, the quantum builder component 2505 may use a compiler to build quanta by inserting synchronization code within multithreaded application code to track operations in the control-flow-graph ("CFG") generated by the compiler. It is noted that quanta need not be of uniform size as long as the size is deterministic. Such synchronization code may be inserted, for example, at the beginning and end of function calls, and at the tail end of CFG back edges. The inserted code tracks quantum size and when the target size has been reached, it calls back to the DMP component 2510. In some embodiments, the facility augments source code, an intermediate representation of source code, or an executable. In some embodiments, the inserted code includes one or more deterministic multiprocessing ("DMP") functions and/or data structures. The inserted DMP functions may call back to a runtime system, which may be provided by a DMP component 2510, which maintains one or more data structures (e.g., a shared-memory data structure 2520). When the augmented code is executed by a multiprocessing system, the inserted DMP functions and data structures are then used to control the order in which operations are performed, such as memory and I/O operations, system calls, and so on. By controlling the order in which threads perform such operations, the facility enables the multithreaded application to behave deterministically. That is, given the same input, threads of a multithreaded application may interleave some or all of their operations deterministically, thereby providing the same output. Those skilled in the art will appreciate that the facility may be extended to control other thread operations.

In some embodiments, after the code is augmented, a compiler re-optimizes the code, such as, for example, inlining all calls to the DMP library. Those skilled in the art will appreciate that the compiler may perform other optimizations to the augmented code not specifically described herein.

Figure 16:
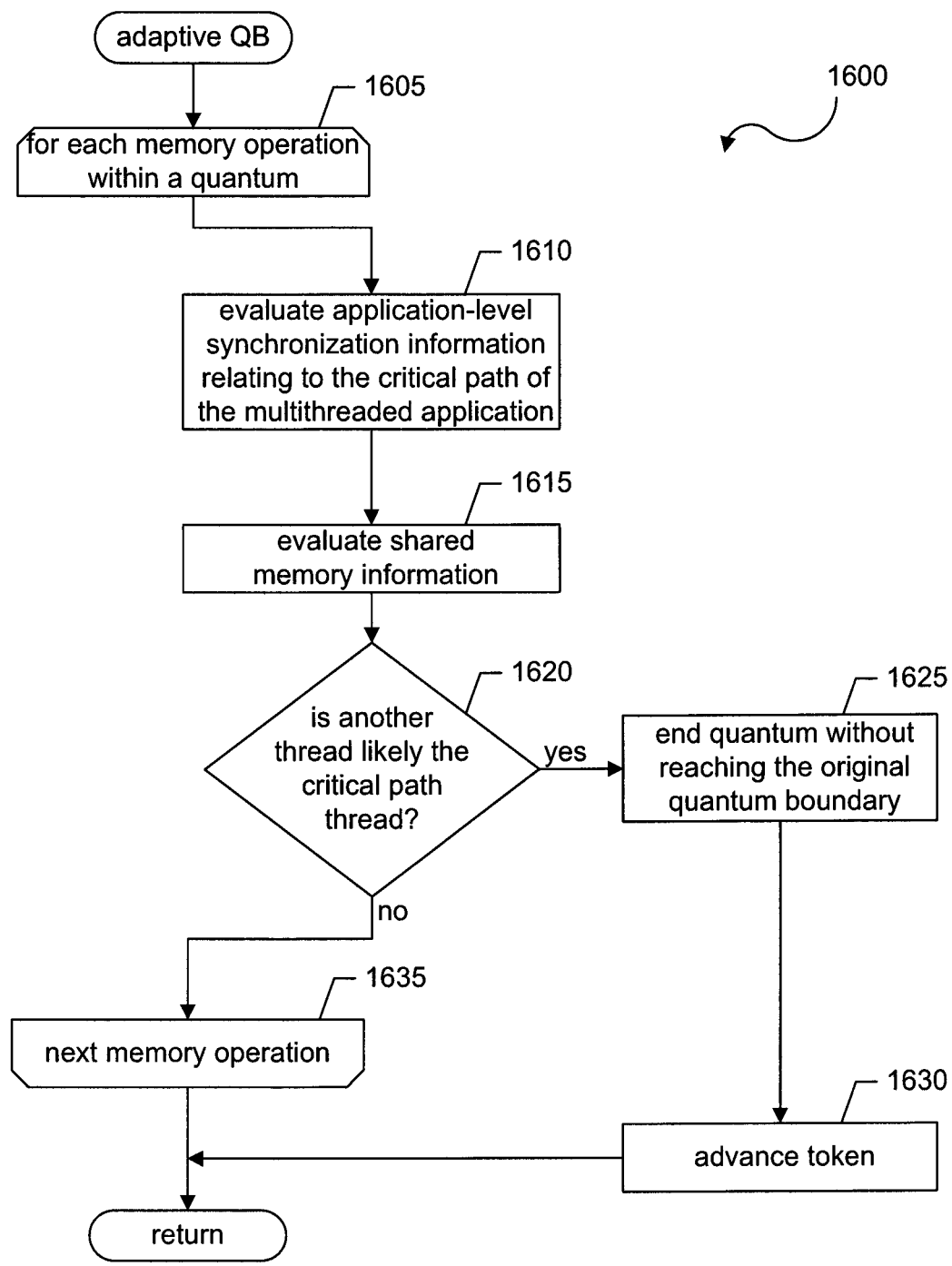
FIG. 16 is a flow diagram showing an adaptive quanta process performed by the facility in one or more embodiments.

In some embodiments, a multithreaded application is divided into quanta by counting instructions and establishing a quantum boundary when a predetermined number of operations is reached. In some embodiments, an adaptive quanta building technique is employed to account for the fact that threads typically do not progress at the same rate and to thereby improve the threads' progress on the critical path of execution of a multithreaded application. That is, each thread may have a different, yet deterministic, quantum boundary. FIG. 16 is a flow diagram showing an adaptive quanta process 1600 performed by the facility in one or more embodiments. In some embodiments, the process 1600 is performed by the facility while a thread holding the token executes a quantum having a finite, predefined number of memory operations. In steps 1605-1635, the facility loops through each memory operation of the quantum to determine whether to adapt the quantum boundary and thereby improve performance of the critical path of execution of a multithreaded application. In step 1605, the facility selects a memory operation of the quantum.

In step 1610, the facility evaluates application-level synchronization information relating to the critical path of the multithreaded application. In some embodiments, the facility evaluates application-level synchronization information to determine whether another thread is likely the critical path thread. For example, such information may include an indication of whether the selected memory operation results in the thread holding the token releasing an application-level lock. The rationale is that, when the thread holding the token releases an application-level lock, other threads might be spinning waiting for that lock. As another example, such information may include an indication of whether another thread has started to spin on an application-level lock. The facility evaluates the application-level synchronization information to determine whether the token should be advanced forward as early as possible to allow a waiting thread to make progress. In some embodiments, a compiler or binary rewriting tool is used to insert a call back to the DMP component to notify the facility when a thread releases, or starts to spin on, an application-level lock. In some embodiments, hardware is used to monitor for changes in application-level synchronization information. For example, typically special instructions are used to implement locks (e.g., lock prefix instructions, load linked/store conditional, test/test&set instructions, etc.). As another example, the hardware may offer special instructions that software uses to indicate when locks are being released/acquired.

In step 1615, the facility evaluates shared memory information. In some embodiments, the facility evaluates shared memory information to determine whether the thread holding the token has potentially completed work on shared data such that the token may be advanced to the next thread. For example, such information may include an indication of whether a predetermined threshold has elapsed (e.g., time period, number of instructions, etc.) in which the thread holding the token has not issued a memory operation to shared memory. The rationale is that, when the thread holding the token is working on shared data, it is expected that other threads will access that data soon. By ending a quantum early and passing the token, another thread will potentially consume the data earlier than if the quantum is completed. In some embodiments, the predetermined threshold is measured as a finite number of operations, such as, for example, 30 memory operations. In some embodiments, the facility uses a shared-memory data structure to track the number of accesses made to shared memory by the thread holding the token and then compares that number to one or more predefined thresholds. In some embodiments, the facility implements a shared memory monitor that notifies the facility when a predefined threshold elapses.

In step 1620, if the facility determines that another thread is likely the critical path thread based on the information evaluated in steps 1610-1615, then the facility continues to step 1625, else the facility continues to step 1635. In step 1635, if additional memory operations within the quantum remain, then the facility loops back to step 1605, else the process 1600 completes.

In step 1625, the facility ends the quantum without reaching the original quantum boundary. It is noted that under some circumstances, the facility's determination to end a quantum boundary may actually coincide with the last operation of the quantum (i.e., the original quantum boundary). That is, if in step 1620 the facility determines that another thread is likely the critical thread and no memory operations remain within the quantum, then the facility may in fact end the quantum in step 1625 at the original quantum boundary.

In step 1630, the facility advances the token to the next thread according to the deterministic order, and then the process 1600 completes. In some embodiments, prior to ending the quantum, the facility issues a barrier instruction that causes the thread holding the token to perform a memory fence at the edge of the new quantum boundary, where inter-thread communication occurs. A memory fence is an instruction that causes a processor to enforce an ordering constraint on memory operations issued before and after the barrier instruction. By issuing a barrier instruction, the facility guarantees that all memory operations executed by the thread holding the token are completed before the token is advanced to the next thread. As a result, changes to memory caused by the thread holding the token to memory become visible to all of the threads of the multithreaded application. It is noted that, even if the facility ends a quantum as a result of information that a particular thread began to spin on an application-level lock, the facility does not advance the token to that thread unless it corresponds to the next thread in the deterministic order.

Those skilled in the art will appreciate that the information evaluated by the facility to determine whether to end a quantum may include other types of information relating to the thread holding the token, the selected memory operation, DMP and/or application-level synchronization information, shared memory information, and so on. For example, in some embodiments, when the selected memory operation is a system call that does not include inter-thread communication via shared memory, the facility ends the quantum and advances the token to the next thread prior to the system call. The rationale is that system calls typically take a longer amount of time to complete and may not require the token. As a result, by ending the quantum and advancing the token to the next thread before the system call is invoked, the facility provides another thread with the opportunity to make progress earlier than if the quantum completed.

Figure 17:
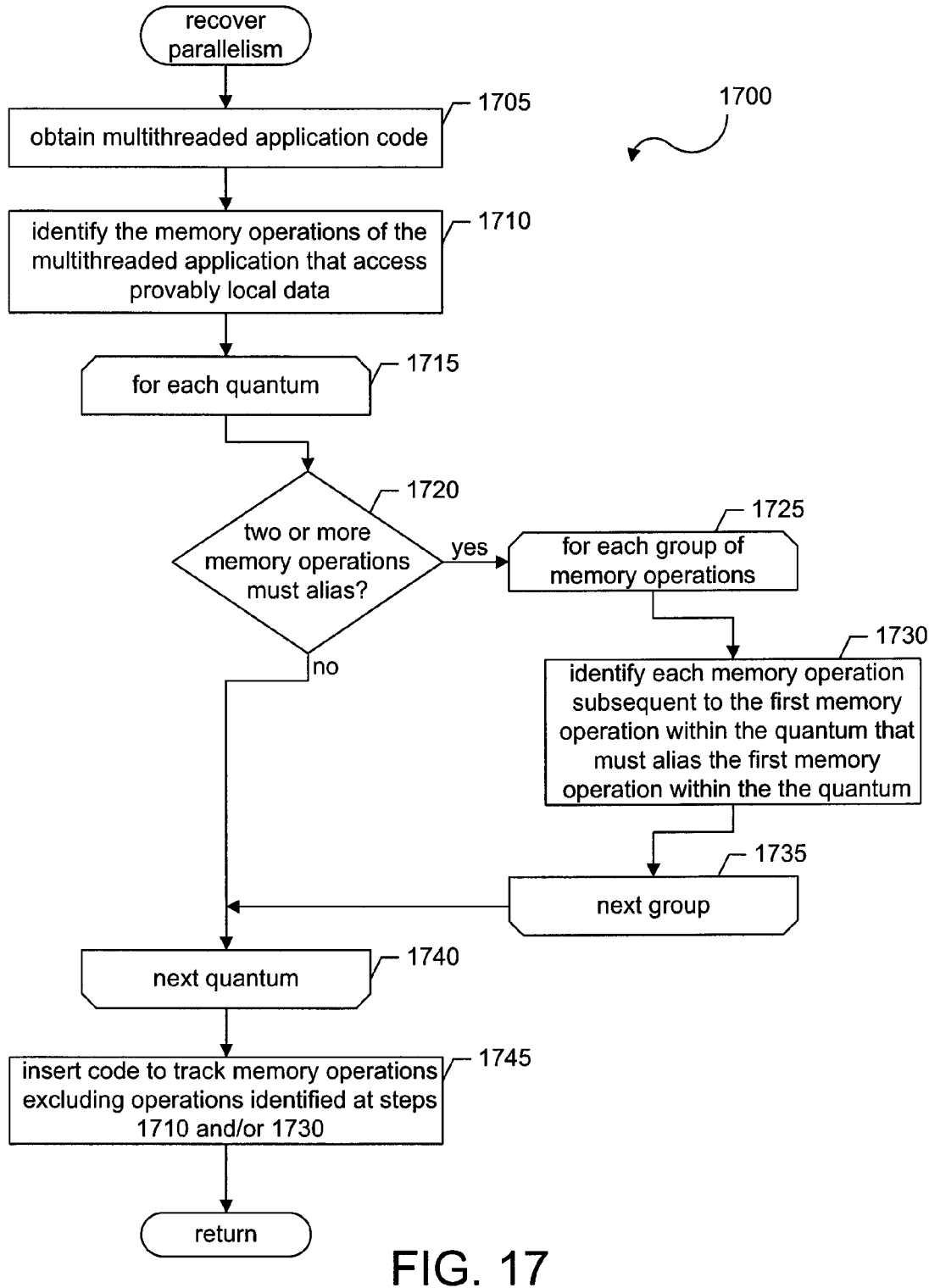
FIG. 17 is a flow diagram of a process performed by the facility to reduce the overhead associated with accessing a shared memory data structure in one or more embodiments.

In some embodiments, the facility recovers parallelism and reduces the overhead associated with accessing a shared-memory data structure by identifying memory operations that access locations that are provably local to a single thread and/or memory locations within a single quantum that must alias. FIG. 17 is a flow diagram of a process 1700 performed by the facility to reduce the overhead associated with accessing a shared memory data structure in one or more embodiments. In step 1705, the facility obtains the code of a multithreaded application, then continues to step 1710. For example, this may include reading the binary form of the multithreaded application code from the source file. As another example, this may include a compiler or a binary rewriting tool translating a binary form of the multithreaded application into an intermediate form, such as a control flow graph. Control flow graphs are representations of program execution that specify operations as nodes of a graph.

In step 1710, the facility identifies memory operations of the multithreaded application that are guaranteed to be local to a single thread of the multithreaded application (i.e., "provably local" during code generation), then the facility continues to step 1715. In some embodiments, the facility uses escape analysis to identify memory operations that access provably local data. When data is allocated in a function and the function returns a pointer to that data, the data is said to "escape" to other threads of execution or to the calling function. Data can also escape if it is stored in a global variable or other data structure that, in turn, escapes the current function or thread of execution.

In steps 1715-1740, the facility loops through each quantum of the multithreaded application code. In step 1715, the facility selects a quantum, then continues to step 1720. In step 1720, if the facility determines that two or more memory operations within the selected quantum point to the same memory location (i.e., that the memory operations "must alias"), then the facility continues to step 1725, else continues to step 1740. For example, memory operations must alias if both the base addresses and the offsets are the same. In steps 1725-1735, the facility loops through each group of memory operations that must alias within the selected quantum. In step 1725, the facility selects a group of memory operations that must alias within the selected quantum, then continues to step 1730. In step 1730, the facility identifies each memory operation that is subsequent to the first memory within the selected quantum that must alias the first memory operation, then the facility continues to step 1735. In step 1735, if additional groups remain, then the facility loops back to step 1725, else the facility continues to step 1740. In step 1740, if additional quantum remain, then the facility loops back to step 1715, else the facility continues to step 1745. In step 1745, the facility inserts code to track memory operations other than the memory operations identified in steps 1710 (i.e., memory operations accessing data that is provably local) and/or 1730 (i.e., memory operations within a quantum that must alias to an earlier memory operation within the same quantum), then the process 1700 ends. By accessing the shared-memory data structure once per data item per quantum and by not requiring a thread to hold the token to access its provably local data, the facility recovers parallelism and reduces the overhead associated with checking the shared-memory data structure.

In some embodiments, the facility includes a binary rewriting tool to profile a multithreaded application as it executes to identify memory operations that are local to a single thread. For example, the binary rewriting tool may profile a multithreaded application by instrumenting the application executable to monitor the state of a shared-memory data structure. Memory locations accessed by a single thread during execution of the multithreaded application may be identified as local. When the profiling information is stable across multiple executions, the identified memory operations may be performed without requiring a thread to hold the token. However, it is noted that this technique may not provide full determinism, since the profiling pass reflects a particular execution of the multithreaded application.

Figure 6:
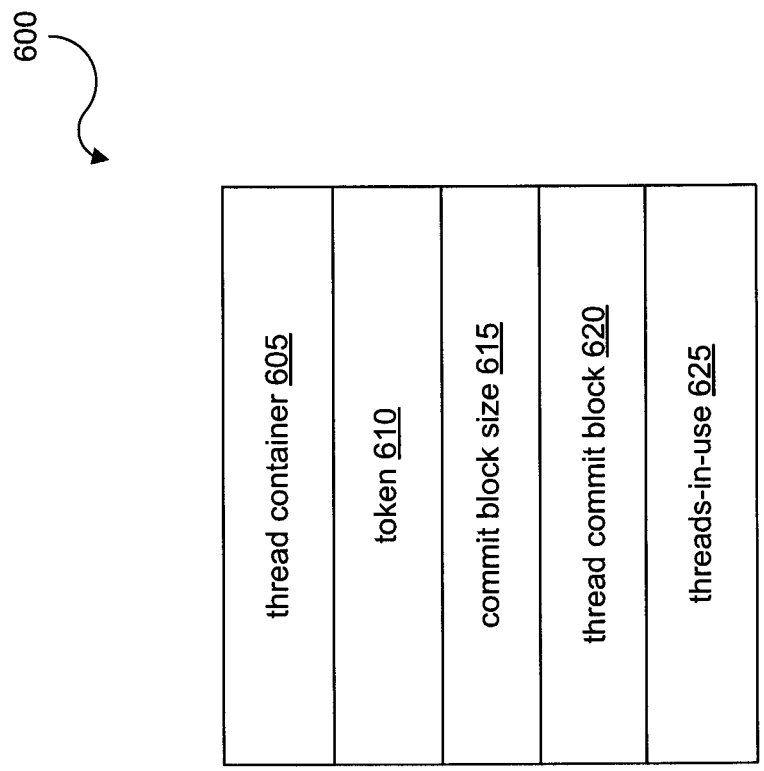
FIG. 6 is a high-level block diagram showing a data structure used by the facility to make multiprocessor code deterministic in one or more embodiments.

In some embodiments, the facility includes a DMP data structure, referred to herein as a "thread data structure," the details of which are discussed below in connection with FIG. 6. However, it is noted that any number of DMP data structures may be included. It is further noted that the thread data structure may represent multiple DMP data structures. In some embodiments, the thread data structure stores a thread identifier ("ID") corresponding to each thread that is created by the multithreaded application during execution. For example, the thread data structure may include an array, linked list, a queue or other data structure of thread IDs (referred to herein as a "thread container").

In some embodiments, the thread data structure includes a token that may be used to control the order of quantum execution. For example, in some embodiments, prior to executing a quantum, a thread determines whether the current value of the token matches the ID of the thread. When the ID of a thread matches current value of the token, the thread may execute the quantum. Otherwise, the thread waits to execute the quantum until the current value of the token matches its identifier.

In some embodiments, the order in which threads are created corresponds to the order in which the threads are deterministically executed. For example, as each thread is created, the thread's corresponding thread ID may be sequentially stored in the thread container (e.g., a thread ID of 1 for the first-created thread; a thread ID of 2 for the second-created thread; etc.). As operations are executed, the threads may invoke certain DMP functions that operate to advance the value of the token by sequentially looping through the thread IDs stored in the thread container based on the sequence in which the thread IDs were stored (beginning with the first thread ID). It is noted that, when a thread exits, the thread's corresponding ID is typically removed from the thread container.

In some embodiments, the thread data structure stores a value corresponding to a finite, deterministic number (i.e., quantum) of controlled operations or blocks that may be executed by a thread whose thread ID matches the current value of the token before the token is advanced. This number of controlled operations or blocks is referred to herein as the "commit block size." The commit block size may range from one to N controlled operations or blocks. Those skilled in the art will appreciate that there are performance tradeoffs associated both large and small commit block sizes. For example, when the commit block size is too small, the performance of the multithreaded application will suffer as a result of the overhead associated with context switches between threads. As another example, when the commit block size is too large, the performance of the multithreaded application will suffer because many or all threads may be forced to wait for the thread whose thread ID matches the token (and every thread whose thread ID precedes its thread ID) to exit actually execute the number of controlled operations specified by commit block size. In at least one embodiment, the commit block size is equal to one thousand (10,000).

In some embodiment, the commit block size is configurable. For example, the commit block size may be configured by a software developer to programmatically manipulate and test the various thread interleavings of a multithreaded application. As another example, the commit block size may be automatically configured based on the maximum number of threads that may be created by the multithreaded application and/or the number of processor or cores of the multiprocessing system on which the multithreaded application executes. Those skilled in the art will appreciate that a variety of techniques may be used to count the number of controlled operations performed by a thread. For example, in some embodiments, the thread data structure includes a value corresponding to the number of controlled operations that have been performed by a thread whose thread ID matches the current token ID. Each time the thread performs a controlled operation, the number of controlled operations in incremented, and the compared to the commit block size. If the number of controlled operation equals the commit block size, then the token is advanced to the next thread ID, and the number of controlled operations is reset to zero.

By augmenting a multithreaded application to control the ordering of certain thread operations (such as, e.g., controlled thread operations), the development process is substantially simplified. For example, the facility can be used by a software developer to directly manipulate thread interleavings of a multithreaded application, thereby allowing for substantially better test coverage of the multithreaded application. A developer may manipulate the interleavings of controlled thread operations, for example, by modifying the commit block size. As another example, a developer may manipulate the interleavings of controlled thread operations by modifying the deterministic order in which the threads execute. In some embodiments, the facility enables a software developer to mark code as being inserted for augmentation purposes, such that the inserted code will not affect quantum building.

Figure 23:
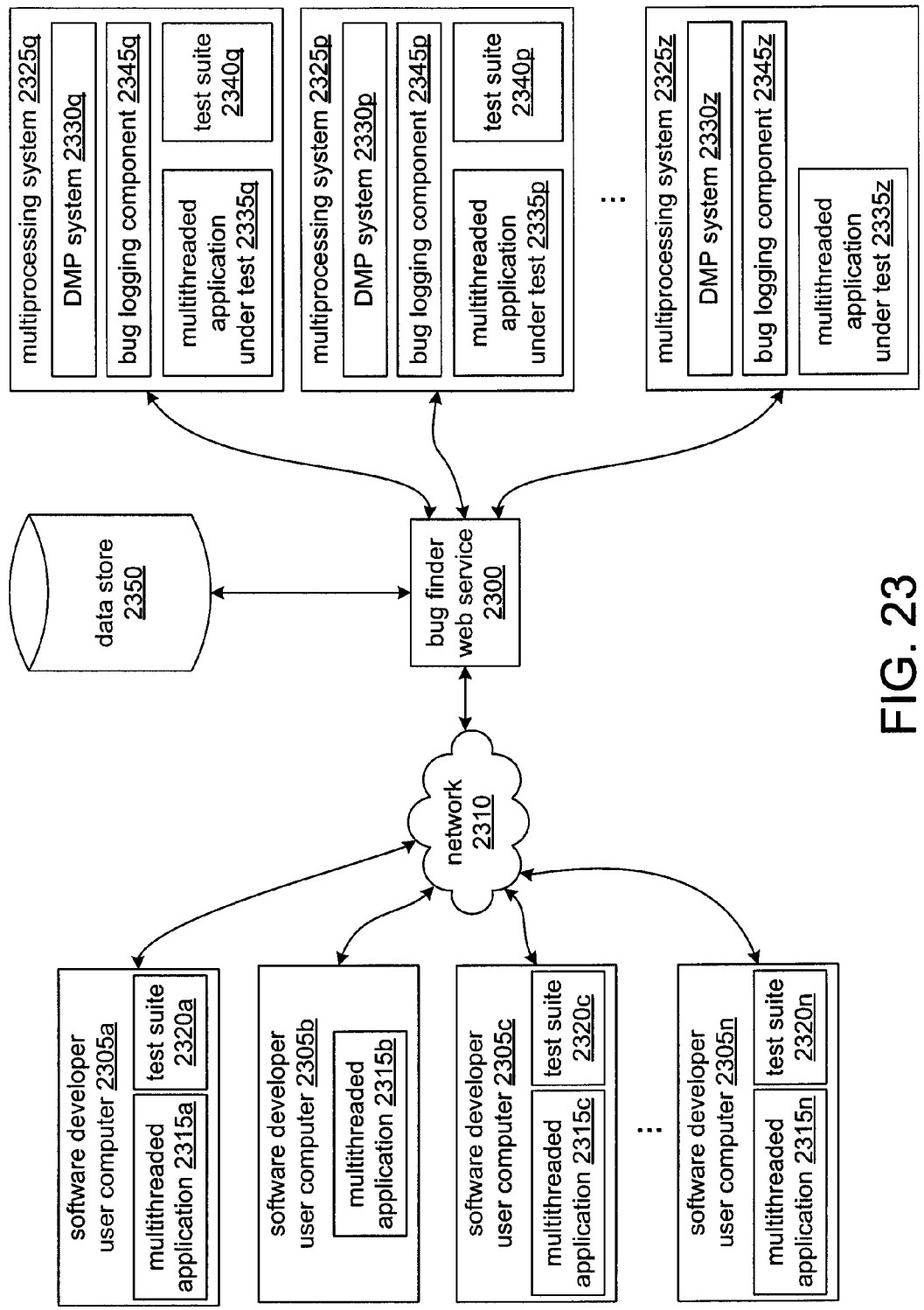
FIG. 23 is a high-level data flow diagram showing a bug finder web service in one or more embodiments.

In some embodiments, the facility provides a bug finder web service to which software developers may submit their applications for testing. FIG. 23 is a high-level data flow diagram showing a bug finder web service 2300 in some embodiments. In the illustrated embodiment, the bug finder web service 2300 receives a request from a software developer using a computer 2305 via a network 2310, such as the Internet or a local area network. In some embodiments, the request includes a copy of a multithreaded application 2315 to be tested. For example, the request may include a multithreaded application binary. As another example, the request may include source code of a multithreaded application. In some embodiments, the request includes an indication of a location at which a copy of the multithreaded application 2315 may be retrieved. In some embodiments, the request includes a test suite 2320 with which the application is to be tested.

In some embodiments, in response to receiving a request to test a multithreaded application 2315, the bug finder web service 2300 dispatches the request to a multiprocessing system 2325. The multiprocessing system 2325 includes a deterministic multiprocessing (DMP) system 2330, such as DMP system 500, that is used to deterministically control execution of the multithreaded application under test (MUT) 2335 and to programmatically test the various thread interleavings of a MUT 2335. In some embodiments, the multiprocessing system 2325 includes a test suite 2340 that is used to test the MUT 2335. For example, the test suite 2340 may include one or more inputs and the expected corresponding output. As another example, the test suite 2340 may include one or more automated scripts that simulate user interaction with the MUT 2335. In some embodiments, the MUT 2335 is executed directly on the multiprocessing system 2325. In some embodiments, the MUT 2335 is executed within a virtual machine executing on the multiprocessing system.

In some embodiments, the multiprocessing system 2325 include a bug logging component 2345. The bug logging component 2345 may observe when a MUT 2335 produces an incorrect output for a specified input and/or when a MUT 2335 crashes. When a MUT 2335 produces an incorrect output or crashes, the bug logging component 2345 determines the source of the bug that produced the incorrect output or crash (e.g., one or more shared memory accesses for a particular deterministic thread order). The bug logging component 2345 then stores the determined source of the bug in a bug log. In some embodiments, the bug log is stored in a data store 2350. The data store 2350 may include a copy of the MUT 2335 or an indication of a location at which a copy of the MUT 2335 may be located (e.g., the multiprocessing system 2325 on which the MUT 2335 was tested). The data store 2350 may include a test suite 2340 or an indication of a location at which the test suit 2340 may be located. The data store 2350 may include other information, such as account information associated with the software developer or vendor of the MUT 2335.

In some embodiments, the bug finder web service 2300 is provided as a free service. That is, the bug finder web service 2300 tests a multithreaded application 2315 without charging the software developer. In some embodiments, the bug finder web service 2300 tests a multithreaded application 2315 based upon a paid time-based subscription, or in exchange for a per-testing cycle charge.

In some embodiments, the bug finder web service 2300 operates in accordance with the following business model. It sends a message to the software developer indicating the test results. When no bugs are identified in the MUT 2335, the bug finder web service 2300 sends a message to the software developer indicating that no bugs were identified in the MUT 2335. When bugs are identified, the bug finder web service 2300 send a message to the software developer indicating that bugs were identified. In some embodiments, the message includes an offer to sell the identification of the bugs to the software developer for a fee. For example, the fee may be based on the number of bugs identified, a flat fee, etc. If the software developer accepts the offer, the bug finder web service reveals each of the identified bugs to the software developer. For example, the identified bug results may be displayed in a web page to the software developer. As another example, the identified bug results may be sent in a message to the software developer. In some embodiments, for each identified bug, the results include: an indication of the input, an indication of the incorrect output or that the MUT 2335 crashed, the one or more shared memory accesses that produced the identified bug, the thread order that produced the identified bug, the quanta size, and so on. In some embodiments, the message includes a mechanism to replay the identified bugs on the computer 2305 of the software developer. For example, the message may include the binary application instrumented to control the order in which threads execute and the parameters used to identify the bug (e.g., the quanta size and/or thread order). In some embodiments, the message includes an option to report one or more of the identified bugs to a centralized bug library, such that the reported bugs may be avoided by customers that have deployed multithreaded application 2315. Bug avoidance is discussed further herein in connection with FIGS. 18-20.

While various embodiments are described in terms of the environment described above, those skilled in the art will appreciate that the bug finder web service 2300 may be implemented in a variety of other environments including a single, monolithic computer system, as well as various other combinations of computer systems or similar devices connected in various ways.

Figure 24:
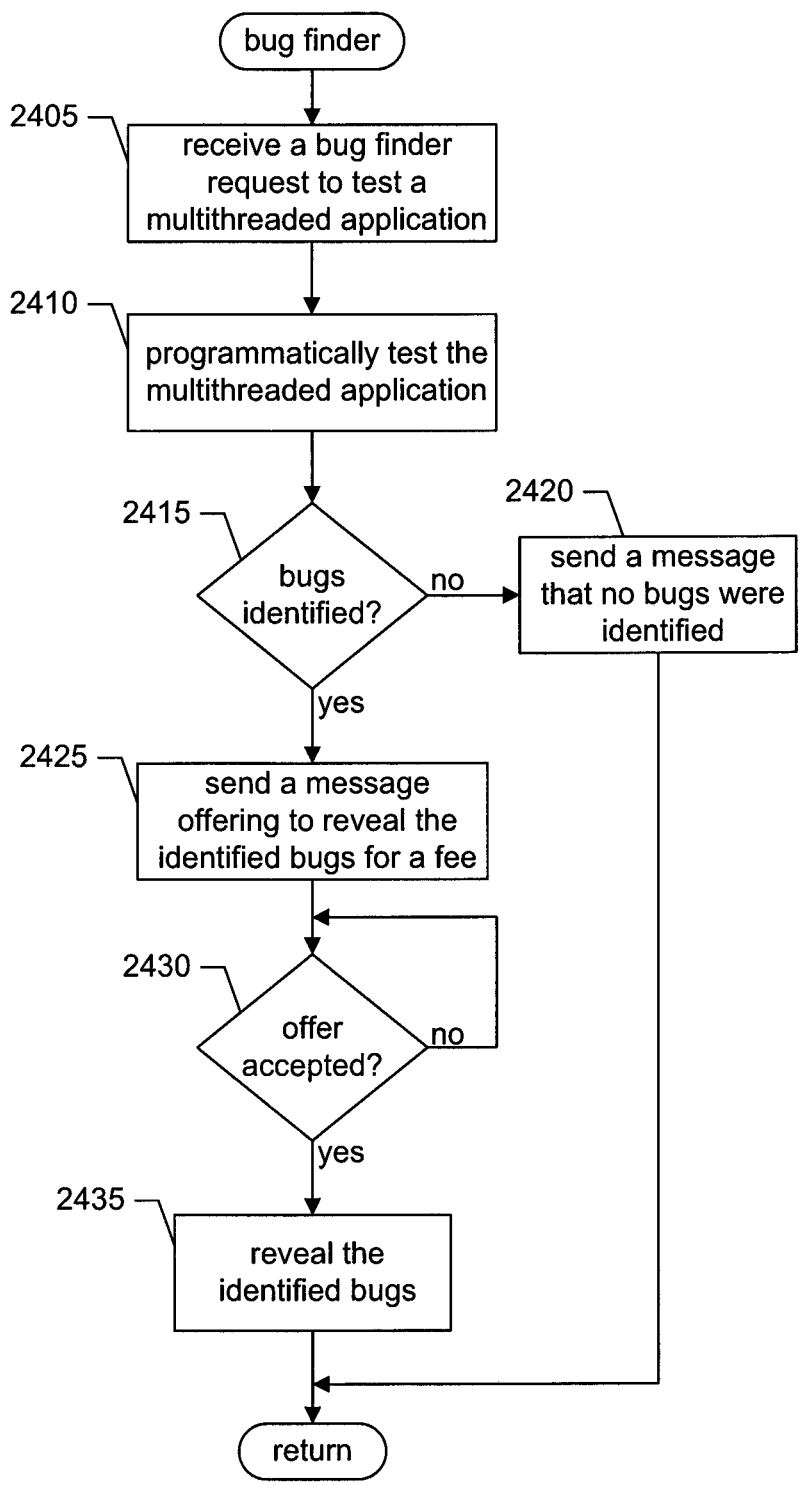
FIG. 24 is a flow diagram of a bug finder process performed by the facility in one or more embodiments.

FIG. 24 is a flow diagram of a bug finder process 2400 performed by the facility in some embodiments. The shown bug finder process 2400 is free to a software developer unless bugs are identified and the software developer chooses to pay a fee to have the identified bugs revealed. In step 2405, the facility receives a bug finder request to test an application such as a multithreaded application. For example, the request may be received from a software developer via a network, such as the Internet. The request may include a multithreaded application binary and/or a test suite with which the multithreaded application is to be tested. In step 2410, the facility programmatically tests the various thread interleavings of the multithreaded application. For example, the facility may test the multithreaded application using the inputs and/or scripts included in a test suite. For each execution pass of the multithreaded application, the facility may modify the quanta size and/or the thread execution order to programmatically test a plurality of thread interleavings of the multithreaded application. In step 2415, if any bugs are identified, then the facility continues to step 2425, else the facility continues to step 2420. In step 2420, the facility sends a message indicating that no bugs were identified, then the process 2400 ends. In step 2425, the facility sends a message offering to reveal the identified bugs to the software developer for a fee. In step 2430, if the offer is accepted, then the facility continues to step 2435, else the facility loops back to step 2430. In some embodiments, the facility stores the identified bugs for later retrieval by the software developer. For example, if the software developer has an account, the facility may store the results for a specified period of time. In step 2435, the facility reveals each of the identified bugs to the software developer. Then the process 2400 completes. In various embodiments, the facility performs a variety of other kinds of testing in addition to or in place of the testing shown and described in connection with step 2410.

In some embodiments, a multithreaded application is deployed in its augmented form. By deploying a multithreaded application in its augmented form, the reliability of the application is substantially increased because, for example, the execution of the multithreaded application "in the field" (i.e., by a customer) will more closely resemble in-house testing of the application. Additionally, if the multithreaded application were to crash or experience a synchronization bug, a software developer may quickly resolve the defect by collecting meaningful crash information from the customer. That is, when deployed in its augmented form, the actions performed by the customer that preceded the crash are meaningful because they allow the software developer to easily reproduce the crash. As a result, the software developer can resolve the defect substantially faster than if the crash or synchronization bug were associated with an unknown interleaving of threads. Accordingly, the facility improves both the development and deployment of multithreaded applications.

Figure 18:
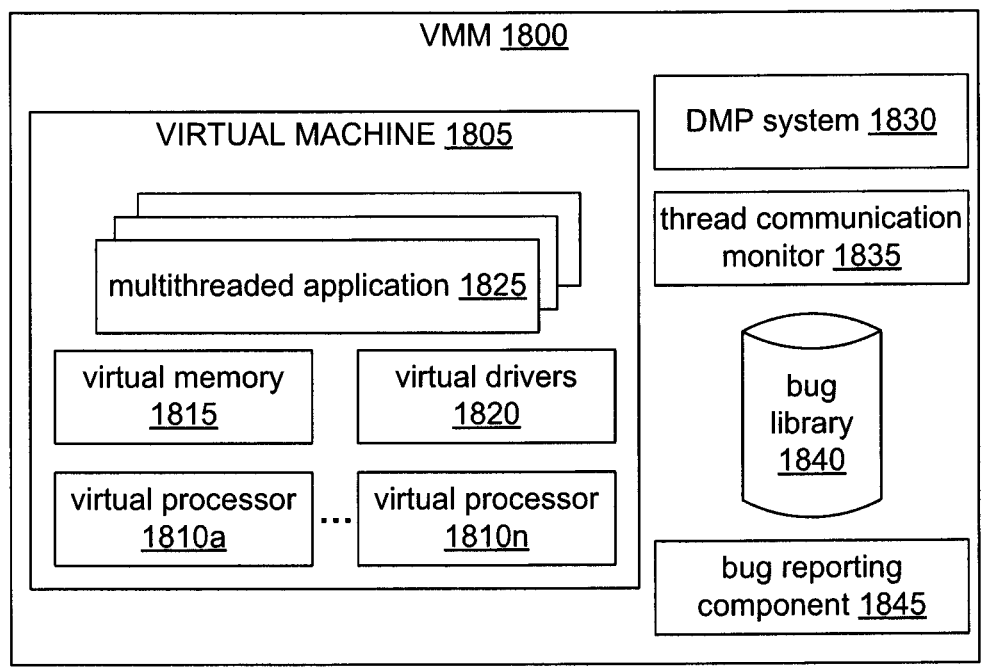
FIG. 18 is a high-level block diagram showing a VMM that executes together with a deterministic multiprocessing system to deterministically control the execution of threads of a multithreaded application within a virtual machine in one or more embodiments.

In some embodiments, the facility is implemented on a multiprocessing system that includes a virtual machine monitor (VMM). A VMM is a software layer that virtualizes the resources of a physical computing system, such as a multiprocessing system, to provide a virtual machine in which an operating system and/or any number of applications may be executed. As used herein, a virtual machine (VM) is a logical instance of a multiprocessing system that is implemented through a VMM. FIG. 18 is a high-level block diagram showing a VMM that executes together with a deterministic multiprocessing (DMP) system to deterministically control the execution of threads of a multithreaded application within a virtual machine in one or more embodiments. Certain well-known structures and functions have not been shown or described in detail to avoid obscuring the description. In some embodiments, a virtual machine monitor (VMM) 1800 is implemented on a multiprocessing system, such as computing system 400 described in connection with FIG. 4. The VMM 1800 provides a virtual machine (VM) 1805 with access to a virtualized set of resources, including virtual processors 1810a-1810n, virtual memory 1815, virtual drivers 1820, etc., that each represent virtual instances of the physical resources on which the VMM 1800 executes. The VM 1805 may also include one or more applications, such as multithreaded application 1825. It is noted that the VMM 1800 may include any number of virtual machines. In some embodiments, VMM 1800 is a "hosted" VMM, meaning that it is treated much like another application on the multiprocessing system and shares use of a system resources with other applications. While in other embodiments, VMM 1800 is a "non-hosted" VMM, meaning that the VMM accesses the system resources directly without operating system support.

In some embodiments, the VMM 1800 includes a deterministic multiprocessing (DMP) system 1830 that divides the multithreaded application 1825 into quanta that are performed in a deterministic order. By controlling the order in which quanta are executed by threads of the multithreaded application 1825, the DMP system 1830 enables the multithreaded application to behave deterministically. In some embodiments, the DMP system 1830 enables the operating system (not shown) to behave deterministically. Note, however, that the DMP system 1830 does not have to be implemented by the VMM 1800. For example, in some embodiments, the DMP system 1830 is implemented outside of the VMM 1800, or by a separate computing system, to which the multithreaded application 1825 is provided as input.

In some embodiments, the VMM 1800 includes a bug reporting component 1845 that observes an application crash, determines a buggy sequence (e.g., one or more shared memory accesses for a particular deterministic thread order that preceded a memory access that ultimately caused the application to crash), and stores the determined buggy sequence in the bug library 1840.

In some embodiments, the VMM 1800 includes a thread communication monitor 1835 that monitors inter-thread communications to detect and avoid known buggy sequences. The thread communication monitor 1835 may detect a buggy sequence by observing the order in which threads access shared memory and reconciling that order with sequences known to be buggy (i.e., ultimately cause the application to crash). A "buggy sequence" may include one or more interleaving patterns (e.g., shared memory accesses for a particular deterministic order) that precede an interleaving that ultimately causes the application to crash. The thread communication monitor 1835 may avoid known buggy sequences that causes the application to crash by selecting a valid interleaving when a buggy sequence is detected. This may be accomplished, for example, by triggering a change to the quanta size or the deterministic order in which the threads are executed.

Figure 19:
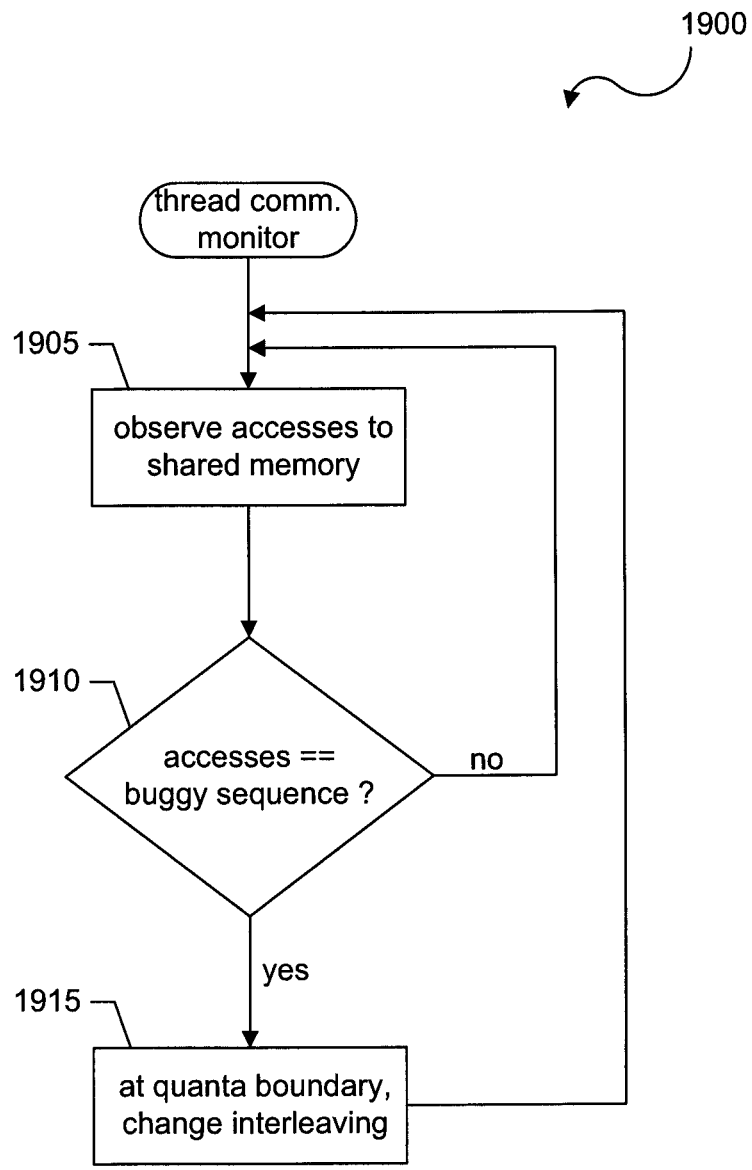
FIG. 19 is a flow diagram of a monitoring process performed by the facility in one or more embodiments.

FIG. 19 is a flow diagram of a monitoring process 1900 performed by the facility in one or more embodiments. For example, the monitoring process 1900 may be performed while a multithreaded application executes within a virtual machine on a multiprocessing system. In some embodiments, the monitoring process 1900 is performed by the thread communication monitor 1835. While the multithreaded application executes, the facility loops through steps 1905-1915. In step 1905, the facility observes the threads' access to shared memory. For example, the facility may observe accesses to one or more specified memory locations and determine whether the access pattern corresponds to a pattern of an interleaving sequence known to be buggy. As another example, the facility may observe N accesses, where N is equal to a number of quanta multiplied by the average number of memory accesses per quantum. It is noted that the number of N observed accesses may vary between applications. As such, references to a particular number should not be taken as restrictive. Those skilled in the art will appreciate that there are performance tradeoffs associated with establishing either too large or small of a number of observed accesses. For example, when the number of observed accesses is too small, the facility may detect an interleaving within a sequence as buggy when it is not. As another example, when the number of observed accesses is too large, the facility may fail to detect a buggy sequence before the application crashes.

In step 1910, if the facility determines that the observed accesses matches a buggy sequence, then the facility continues to step 1915, else the facility loops back to step 1905. In step 1915, at the next quantum boundary, the facility changes the thread interleaving, then the facility loops back to step 1905. For example, the facility may change the deterministic order in which the threads are executed. As another example, the facility may change the quanta size. In some embodiments, the facility changes the thread interleaving when it is determined that the observed accessed match a buggy sequence. That is, in some embodiments, the facility does not wait for the next quantum boundary to be reached. When a multithreaded application is deployed within a VM-based multiprocessing system that provides dynamic avoidance of concurrency bugs, such as 1800, the reliability of the multithreaded application is substantially increased because the user is shielded for the time it takes the vendor of the application to fix the concurrency bugs.

In some embodiments, the bug reporting component 1845 updates the bug library 1840 when an application crashes. In some embodiments, the bug reporting component 1845 updates the bug library 1840 by receiving or fetching bug updates from a bug aggregator service.

Figure 20:
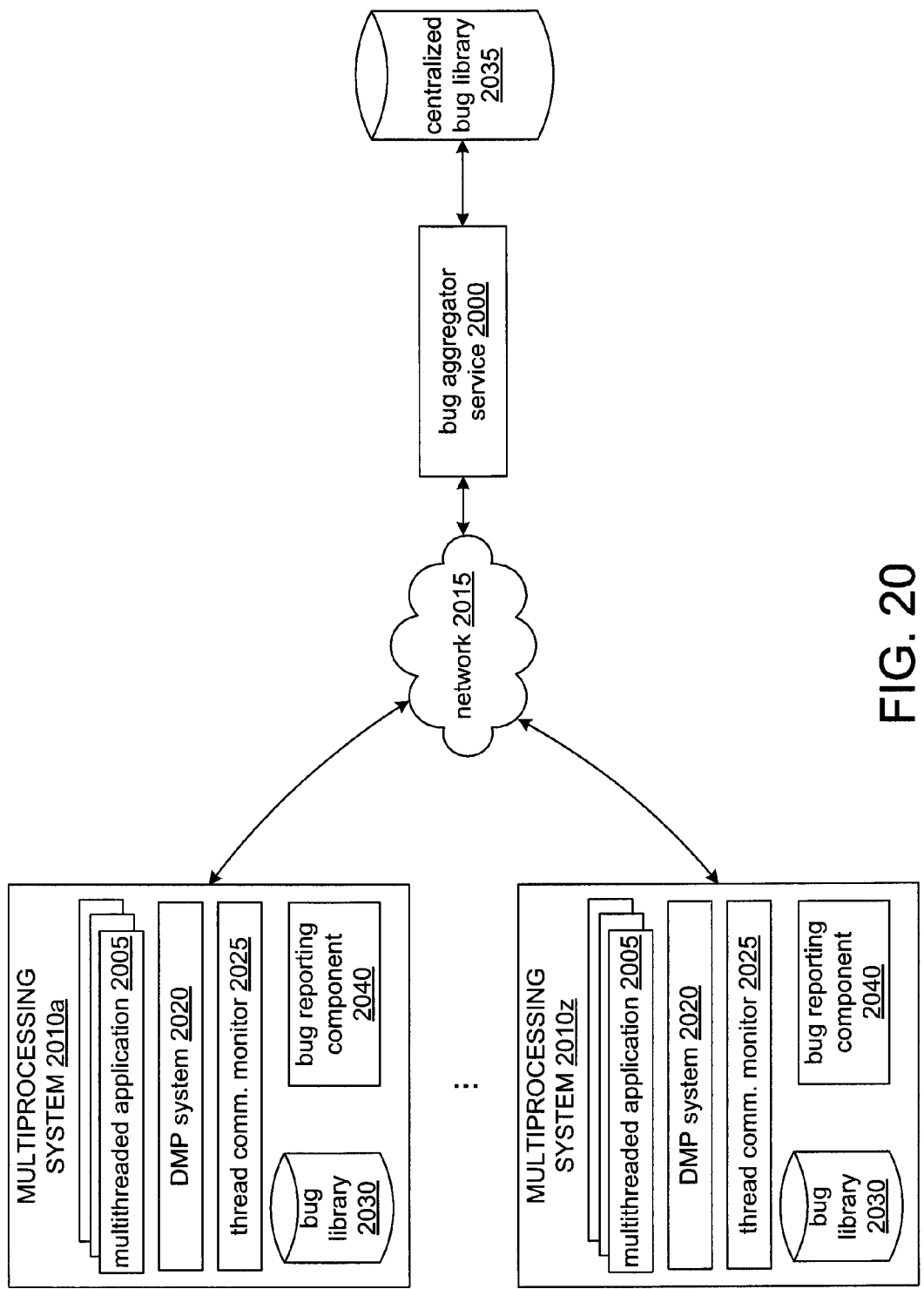
FIG. 20 is a high-level data flow diagram showing a bug aggregator service in one or more embodiments.

FIG. 20 is a high-level data flow diagram showing a bug aggregator service 2000 in one or more embodiments. In some embodiments, the bug aggregator service 2000 aggregates bugs associated with one or more applications. It is noted that the bug aggregator service 2000 may aggregate bugs associated with multithreaded applications and/or single threaded applications. As such, references to multithreaded applications should not be taken as restrictive.

In FIG. 20, a bug aggregator service 2000 sends buggy sequences associated with multithreaded applications 2005 to, and receives buggy sequences from, a number of multiprocessing systems 2010a ... 2010z via a network 2015, such as the Internet or a local area network. In the illustrated embodiment, each multiprocessing systems 2010 includes a DMP system 2020 to enable multithreaded applications 2005 to behave deterministically and a thread communication monitor 2025 to detect and avoid buggy sequences. Buggy sequences accessed by the thread communication monitor 2025 may be stored locally in a bug library 2030 at the multiprocessing system 2010 and/or remotely in a centralized bug library 2035 maintained by the bug aggregator service 2000. In the illustrated embodiments, each multiprocessing system 2010 further includes a bug reporting component 2040 to observe when a multithreaded application 2005 crashes; determine the buggy sequence that produced the crash (e.g., one or more shared memory accesses for a particular deterministic thread order that preceded a shared memory access that ultimately caused the multithreaded application 2005 to crash); and store the determined buggy sequence. The bug reporting component 2040 may store updates to the bug library 2030 of the multiprocessing system 2010 on which it operates, the bug library 2030 of another multiprocessing device, and/or the centralized bug library 2035. Updates to the centralized bug library 2035 may be sent to the bug aggregator service 2000 and/or sent directly to the centralized bug library 2035 via the network 2015. Updates to either the centralized bug library 2035 or a bug library 2030 of a multiprocessing system 2010 may be made on a sporadic basis, on a periodic basis, during periods of low activity, etc. In some embodiments, the updates to a bug library 2030 of a multiprocessing device 2010 are limited to the bugs associated with the multithreaded applications 2005 executed by the multiprocessing system 2010. While in other embodiments, a user interface is provided to select the multithreaded applications 2005 for which updates are to be sent and/or received.

While various embodiments are described in terms of the environment described above, those skilled in the art will appreciate that the collection and/or distribution of bug information may be implemented in a variety of other environments including a single, monolithic computer system, as well as various other combinations of computer systems or similar devices connected in various ways. For example, in various embodiments, a multiprocessing system 2010 implements a virtual machine monitor (not shown) together with a DMP system, thread communication monitor, and bug reporting component to collect and/or share bug information.

In some embodiments, the computing system on which a multithreaded application is developed, and/or on which the multithreaded application is deployed, includes a transactional memory ("TM") system for controlling access to shared memory. The transactional memory system may be a hardware transactional memory ("HTM"), a software transactional memory ("STM") system, or a hybrid hardware-software (HS-TM) system. Both TM systems are known in the art. A STM system provides a programming abstraction through which a thread atomically performs a sequence of operations, some of which may involve one or more shared resources (e.g., memory), without locking or waiting for a shared resource to be freed.

Conventional TM systems are "optimistic" in the sense that a thread completes modifications to shared memory without regard for what other threads might be doing. This is accomplished, for example, by maintaining a log for each thread of a multithreaded application and, for each transaction, each thread sequentially record its operations in its corresponding log. For example, a log may include a number and type of memory locations and values that a thread reads and/or writes during a transaction. At the end of the transaction, if no other thread has concurrently accessed the same shared memory locations, the thread actually performs the sequence of operations (this is commonly referred to as a "commit"). However, if another thread has concurrently accessed one or more of the same memory locations, then the transaction is aborted and restarted. That is, in conventional TM systems, transactions execute concurrently so long as a shared resource is not accessed by more than one thread during the same transaction.

There are a number of disadvantages associated with conventional TM systems. For example, although conventional TM systems somewhat simplify development by allowing developers to declare certain operations or certain sequences of operations as atomic, conventional TM systems do not provide deterministic multiprocessing of multithreaded applications. Additionally, conventional TM systems do not allow software developers to specify or manipulate the interleavings of threads in a multithreaded application. As a result, conventional TM systems also suffer from latent synchronization bugs. Also, compared with HTM systems, STM systems suffer a performance hit as a result of the overhead associated with maintaining a log and the time spent committing transactions.

In some embodiments, the facility controls the order of execution of certain thread operations of a multithreaded application that uses a transactional memory system to control access to shared resources, such as a HTM, STM, or HS-TM system. That is, the facility may control the order in which threads begin and/or commit transactions in a transactional memory system. In some embodiments, the facility augments an application programming interface ("API") provided by a STM system. As one example, the facility may augment the functions of the STM API provided in Table 1 below. It will be appreciated by those skilled in the art that, although some embodiments of the facility are described with reference to the STM API provided in Table 1, the facility may operate on various transactional memory systems.

TABLE 1

| | |
|---|---|
| void STMBeginTransaction( ): | begins a new transaction performed by a thread |
| value STMRead(*addr): | records information in a log about the operation type, address, and/or current value of the shared memory location |
| void STMWrite(*addr, value): | records information in a log about the operation type, address, and/or current value of the shared memory location as a result of the operation |
| bool STMValidTransaction ( ): | determines, based on a thread's log, whether another thread has concurrently accessed one or more of the same shared resources |
| void STMAbortTransaction( ): | aborts a transaction performed by a thread |
| bool STMCommitTransaction( ): | commits a transaction performed by a thread |

In some embodiments, a software developer manually specifies atomic blocks within a multithreaded application. For example, a software developer may include the following atomic block:

```
atomic {
    a = b + c;
}
```

Following compilation, the above example atomic block would be replaced by the following pseudo code:

```
STM__Begin__Transaction( );
try {
    var__1 = STMRead(*b);
    var__2 = STMRead(*c);
```

-continued

```
    STMWrite(*a, var__1 + var__2);
    bool transaction__valid = STMValidTransaction( );
    if (!STMValidTransaction( )) {
        STMAbortTransaction( );
    }
    else if (STMValidTransaction( )) {
        bool transaction__commited = STMCommitTransaction( );
        if (!transaction__commited) {
            throw transaction__failed__to__commit;
        }
    }
}
catch (transaction__failed__to__commit)
{
    ...
}
```

In some embodiments, one or more of the transactions (i.e., atomic blocks) are not visible to the software developer. For example, they may be inserted by the compiler, runtime, TM system, or some combination of thereof. In some embodiments, atomic blocks are augmented irrespective of whether the blocks were specified by a software developer or inserted by the compiler, runtime, or TM system. In some embodiments, when a thread calls an augmented function of the STM API, the function transfers control to a DMP function that checks the corresponding thread ID to the current value of a token, which is used to start and/or commit transactions deterministically. One skilled in the art will appreciate that many different techniques may be used to intercept transactions. For example, some STM APIs provide a callback mechanism through which hooks may be registered to transfer control to a DMP function before and/or after an API function is performed.

Transactions of an augmented transactional memory system are deterministic in size. That is, each thread executes a specific number of operations on blocks (referred to herein as the "commit block size"), and then the threads deterministically attempt to commit, starting with the thread whose ID matches the current value of the token. If a transaction is valid and the thread ID matches the token, then the thread calls STM_Commit_Transaction( ). After a transaction is committed, the token is advanced to the next thread ID. However, if the transaction is invalid (for example, because the thread read from a location written by another thread during that transaction), then the thread calls STM_Abort_Transaction( ). It is noted that the token is typically not advanced until the thread whose thread ID matches the token successfully commits its corresponding transaction.

In some embodiments, certain types of operations will cause a transaction to immediately abort if the current value of the token does not match the thread ID of the thread executing the transaction. For example, when a transaction includes an operation that cannot be undone, such as an I/O operation, the thread executing the transaction determines whether its thread ID matches the token. If its thread ID matches the token, then the transaction may proceed. Otherwise, the transaction may be automatically aborted.

In some embodiments, all threads having thread IDs subsequent to an aborted thread are aborted, while in other embodiments only those threads whose concurrent transactions accessed the same shared resource are aborted and restarted. The token is typically not advanced until the thread whose thread ID matches the token successfully commits its corresponding transaction. As a result, any threads having thread IDs subsequent to an aborted thread, which did not abort their transactions, will wait for the token to match their thread IDs before calling STM_Commit_Transaction( ).

It is noted that when a multithreaded application is executed on a computing system having HTM in its augmented form, the multithreaded application can be executed deterministically with no substantial performance penalty. As a result, software developers and/or manufacturers can deploy their multithreaded applications knowing that they have thoroughly tested for likely thread interleaving. Thus, even if synchronization bugs remain in the multithreaded code, they will not appear to the customer.

Figure 4:
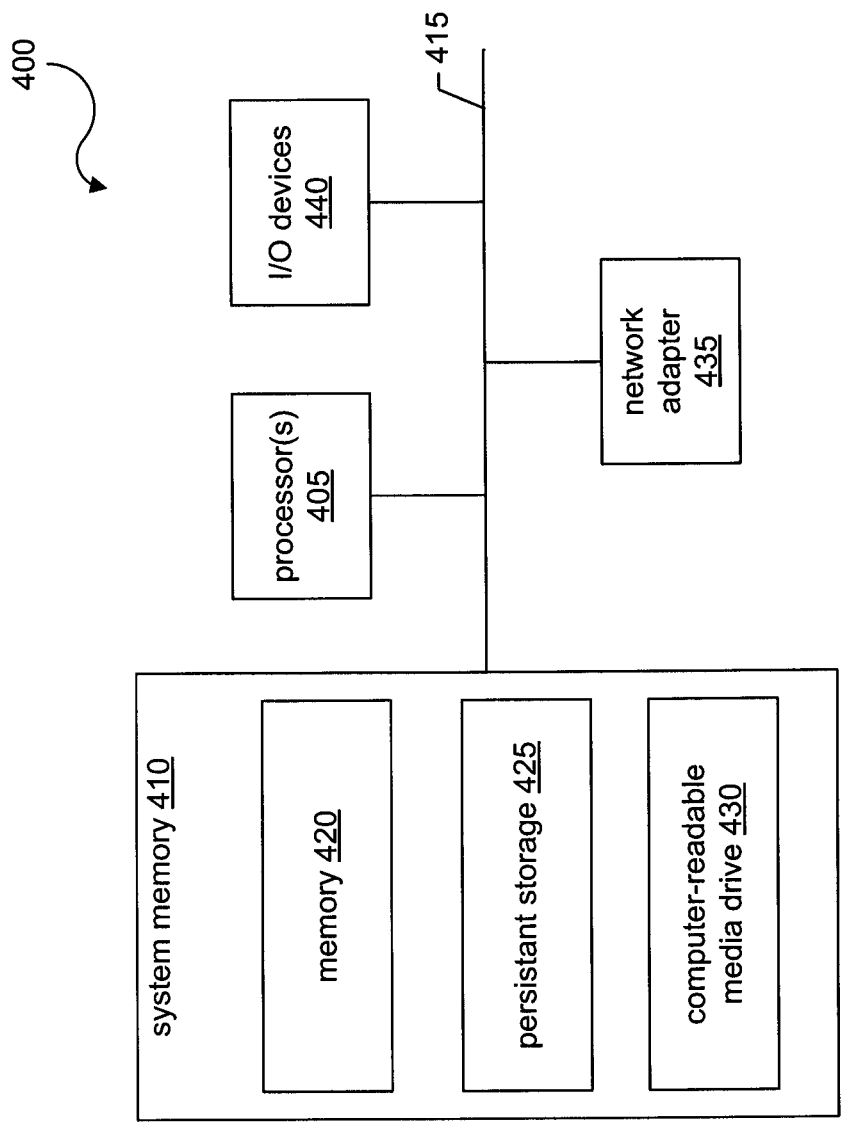
FIG. 4 is a high-level block diagram showing an example architecture of a computing system on which the facility executes in one or more embodiments.

Before describing the facility in greater detail, it is useful to consider an environment in which the facility can be implemented. FIG. 4 is a high-level block diagram showing an example architecture of a computing system 400 on which the facility executes in one or more embodiments. Certain well-known structures and functions have not been shown or described in detail to avoid obscuring the description. The computing system 400 includes one or more processors 405 and memory 410 coupled to an interconnect system 415. The processors 405 are the central processing units ("CPUs") of the computing system 400 and, thus, control its overall operation. In some embodiments, the processors 405 accomplish this by executing software stored in memory 410. In some embodiments, the computing system 400 includes a processor 405 having two or more independent cores in a package composed of a single integrated circuit (referred to as a "die"), one or more dies packaged together, multiple packages, and so on. In some embodiments, the computing system 400 includes a hyper-threaded processor 405 that, despite having only a single core, is capable of performing as a multi-core processor. A processor 405 may be, or may include, one or more programmable general-purpose or special-purpose microprocessors, digital signal processors ("DSPs") programmable controllers, application specific integrated circuits ("ASICs"), programmable logic devices ("PLDs"), or the like, or a combination of such devices.

The interconnect system 415 shown in FIG. 4 is an abstraction that represents any one or more separate physical buses and/or point-to-point connections, connected by appropriate bridges, adapters and/or controllers. The interconnect system 415 may include, for example, a system bus, a form of Peripheral Component Interconnect (PCI) bus, a HyperTransport or industry standard architecture (ISA) bus, a small computer system interface (SCSI) bus, a universal serial bus (USB), an Institute of Electrical and Electronics Engineers (IEEE) standard 1394 bus (sometimes referred to as "Firewire"), and so on.

System memory 410 includes a memory 420 for storing programs and data while they are being used; a persistent storage device 425, such as a hard drive, for persistently storing programs and data; and a computer-readable media drive 430, such as a CD-ROM or DVD-ROM drive, for reading programs and data stored on a computer-readable medium. As used herein, system memory 410 includes any form of volatile, nonvolatile, removable, and non-removable media, or any combination of such media devices that are capable of storing information such as computer-readable instructions, data structures, program modules, and other data of the computing system 400.

Also connected to the processors 405 through the interconnect system 415 is a network adapter 435 and one or more input devices and output devices ("I/O devices") 440. The network adapter 435 provides the computing system 400 with the ability to communicate with other computing systems over a network and may be, for example, an Ethernet adapter. The I/O devices 440 provide a user of the computing system 400 with the ability to access programs and data stored in system memory 410. For example, I/O devices 440 may include input devices such as a keyboard, pointing device, microphone, etc., and output devices such as a display device, speakers, a printer, and so on. While computing systems configured as described above are typically used to support the operation of the facility, those skilled in the art will appreciate that the facility may be implemented using devices of various types and configurations, and having various components.

Figure 5:
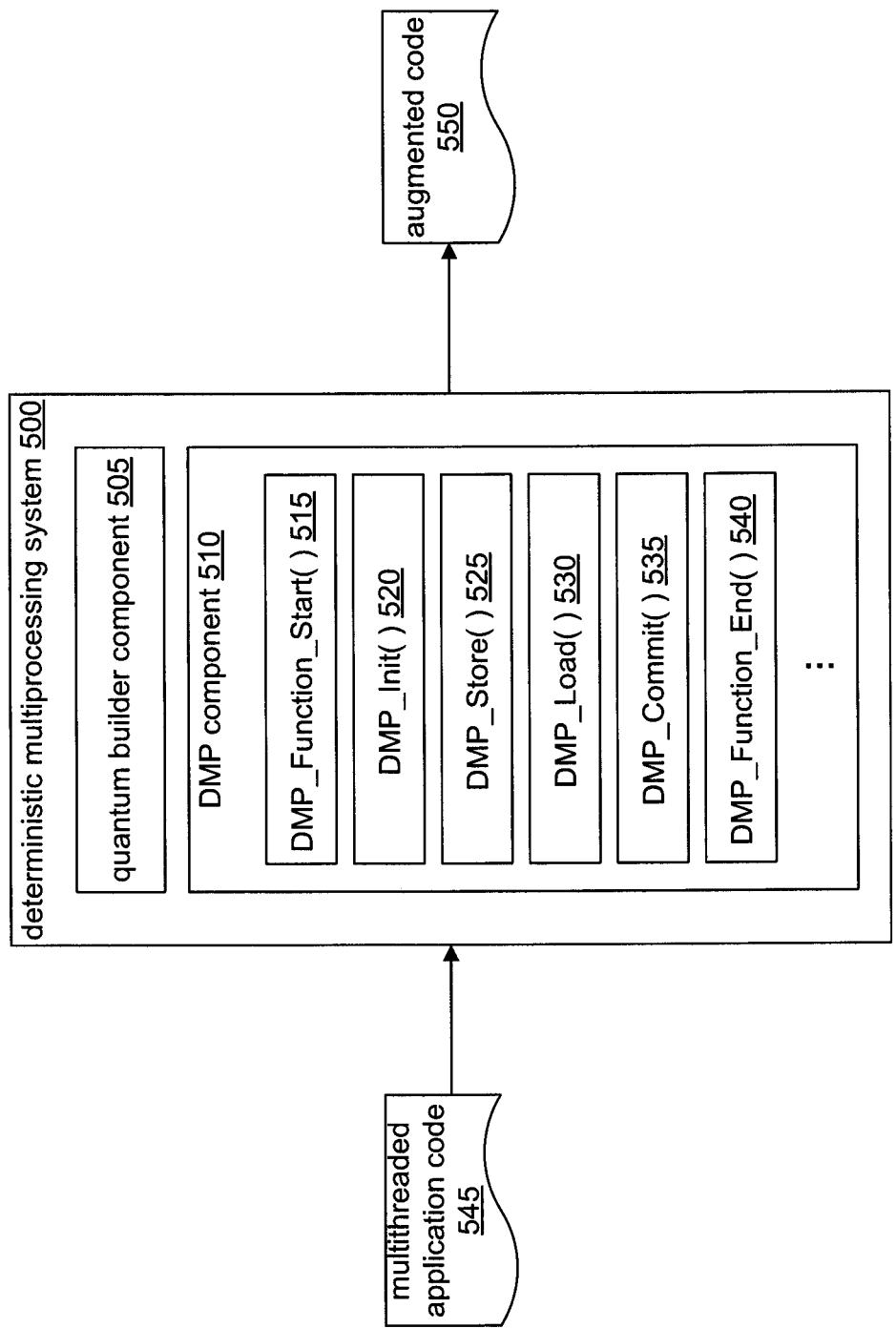
FIG. 5 is a high-level block diagram showing various functional elements of a deterministic multiprocessing system in one or more embodiments.

FIG. 5 is a high-level block diagram showing various functional elements of a deterministic multiprocessing system 500 in one or more embodiments. It is noted that the deterministic multiprocessing system 500 does not have to be implemented by the computing system 400. For example, in some embodiments, the deterministic multiprocessing system 500 is implemented in a separate computing system to which multithreaded software code is provided as input. It is further noted that the DMP system 500 may be implemented in hardware, software, or a combination of hardware and software. As such, references to a specific implementation should not be taken as restrictive.

In some embodiments, the deterministic multiprocessing system 500 includes a quantum builder component 505 and a deterministic multiprocessing ("DMP") component 510. The quantum builder component 505 may be implemented, for example, as a compiler module that augments code of a multithreaded application 545 using one or more of the functions 515-540 provided by the DMP component 510. Those skilled in the art will appreciate that the functions provided by the DMP component 510 may be altered in a variety of ways. For example, certain functions may be merged together or divided; certain functions may be omitted; certain functions may be added; and so on. In some embodiments, the quantum builder component 505 is implemented as a compiler pass within a compiler infrastructure, such as, for example, within the low level virtual machine ("LLVM") compiler infrastructure. While in other embodiments, the quantum builder component 505 is implemented by a separate system to which the multithreaded application code 545 is provided as input.

In the illustrated embodiment, the deterministic multiprocessing system 500 receives and/or accesses the multithreaded application code 545. It is noted that multithreaded application code 545 may represent one or more code files. The code 545 may be the source code of a multithreaded application, an intermediate representation ("IR") of the source code of a multithreaded application, the executable of a multithreaded application, and so on. In some embodiments, the quantum builder component 505 may use a compiler to build quanta by inserting synchronization code within the multithreaded application code 545 to track operations in the control-flow-graph ("CFG") generated by the complier.

The inserted code tracks quantum size and, when the quantum size has been reached, it calls one or more functions provided by the DMP component 510 to control the forward progress of threads within the application. The DMP component 510 may provide a runtime system and/or one or more of the DMP functions 515-540 may be inserted into the code 545. In some embodiments, the deterministic processing system 500 operates together with a transactional memory system and/or implements a sharing table.

In the illustrated embodiment, the DMP library includes a DMP start function ("DMP_Function_Start( ) function 515"), a DMP initialization function ("DMP_Init( ) function 520"), a DMP store function ("DMP_Store( ) function 525"), a DMP load function ("DMP_Load( ) function 530"), a DMP commit function ("DMP_Commit( ) function 535"), and a DMP end function ("DMP_Function_End( ) function 540"). The DMP start function 515 and end function 540 may be used to demarcate when an application function starts and ends. The DMP load function 530 may be used to convey to the deterministic multiprocessing system 500 that a load operation will be, or has been, executed. Similarly, the DMP store function 525 may be used to convey to the deterministic multiprocessing system 500 that a store operation will be, or has been, executed. The DMP store and load functions 525 and 530 are used to control the order of memory operations and thereby enforce deterministic execution of such operations. The DMP initialization function 520 and the DMP commit function 535 may be used to demarcate a block of code that is used to control the order of memory operations or to start or end a transaction. Those skilled in the art will appreciate that the functions provided by the DMP component 510 may be altered in a variety of ways. For example, certain functions may be merged together or divided; certain functions may be omitted; certain functions may be added; and so on.

In some embodiments, the quantum builder component 505 inserts the function 515-540 of the DMP component 510 as listed in table 2 below:

TABLE 2

| | |
|---|---|
| DMP_Function_Start( ) - | inserted at the start of each function included in code 545 |
| DMP_Function_End( ) - | inserted at the end of each function included in code 545 |
| DMP_Load( ) - | inserted prior to each load block |
| DMP_Store( ) - | inserted prior to each store block |
| DMP_Commit( ) - | inserted prior to any jump block; inserted prior to any function call; inserted prior to any OS call; inserted prior to a return block |
| DMP_Init( ) - | inserted at each jump-to block from another block containing a DMP_Commit( ); inserted after each function call; inserted after each OS call; inserted after DMP_Function_Start( ); |

Figure 11:
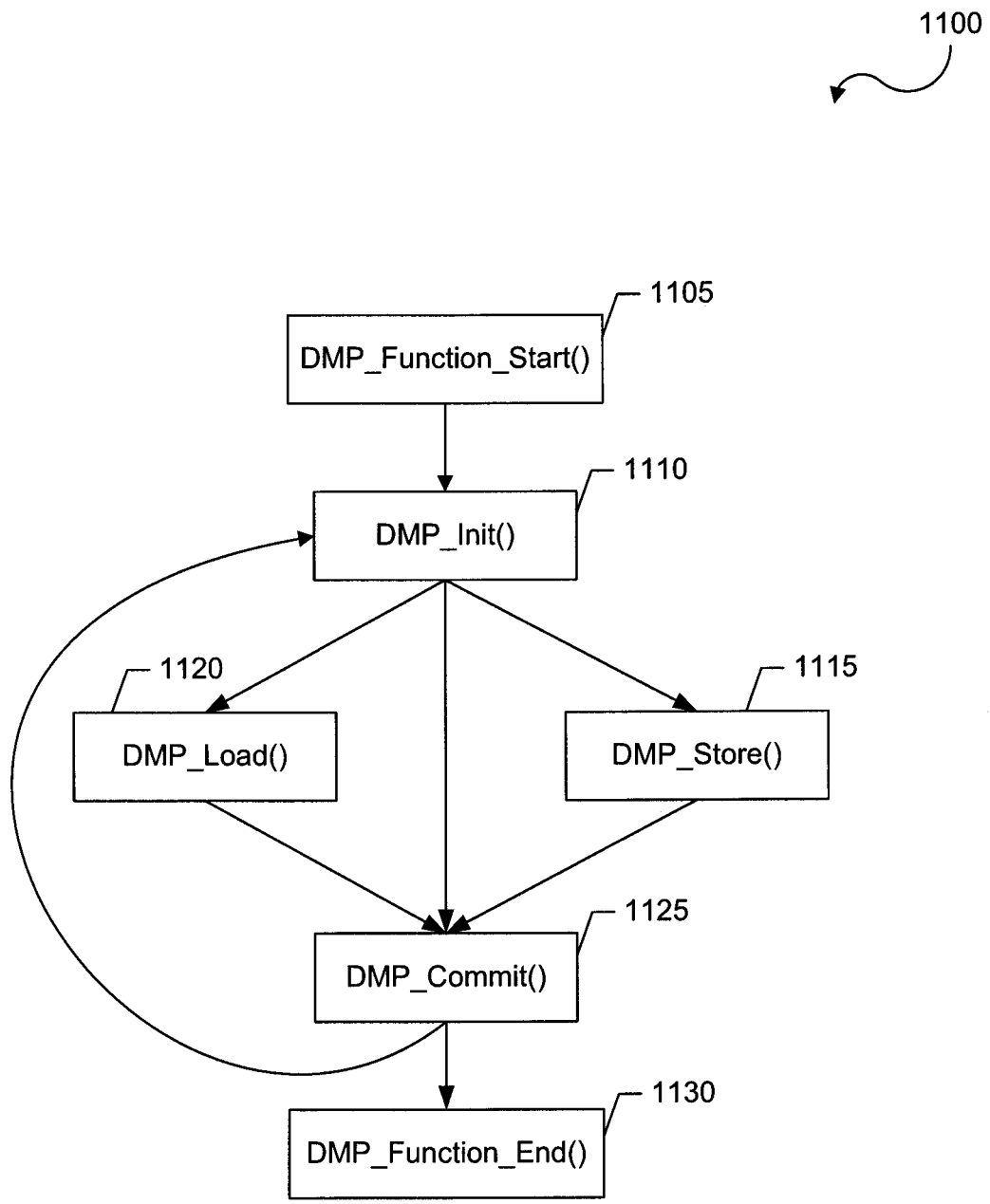
FIG. 11 is an example of a control flow graph of an augmented function of a multithread application in one or more embodiments.

In some embodiments, the quantum builder component 505 creates an intermediate representation of the augmented code, which may be represented, for example, as a control flow graph ("CFG"). FIG. 11 illustrates an example of a control flow graph of a function of multithreaded application code 545 augmented according Table 2. In some embodiments, after the multithreaded application code 545 is augmented, a compiler re-optimizes the augmented code, for example, by inlining calls to the DMP function 515-540. Those skilled in the art will appreciate that the compiler may perform other optimizations to the augmented code not specifically described herein.

In some embodiments, the multithreaded application code 545 uses a transactional memory system, such as an STM, HTM, or HS-TM, to control access by threads to shared resources. In such embodiments, the deterministic multiprocessing system 500 may be used to control the order in which transactions are committed by threads of the multithreaded application. For example, the quantum builder 505 may wrap each quantum in a transaction by inserting a call to a DMP initialization function 520 and a DMP commit function 535. As another example, when the multithreaded application code 545 includes one or more application-level transactional memory blocks, the quantum builder component 505 may augment the multithreaded application code 545 by inserting a call to a DMP initialization function 520 prior to each atomic block declared by a software developer, and by inserting a call to a DMP commit function 535 prior to any call to the TM system to commit an instruction. As yet another example, the deterministic multiprocessing system 500 may augment an interface provided by the TM system by wrapping calls to functions of the TM interface with calls to one or more functions 515-540 of the DMP component 510. As a result, when the deterministic multiprocessing system 500 operates together with a TM system, transactions may be started and/or committed deterministically. It is noted that when the transactional memory system is a HTM system, the DMP load function 530 and DMP store function 525 do not need to be included, as long as the HTM performs such tracking.

In some embodiments, the multithreaded application code 545 is compiled into an executable augmented application 550. While in other embodiments, the augmented application 550 is a machine independent, intermediate language code, which is converted into executable instructions at runtime. Following augmentation, the augmented application 550 may be deterministically executed on a multiprocessing system. That is, given the same input to the augmented application 550, a multiprocessing system will interleave thread quantum deterministically, thereby producing the same output each time the augmented application 550 is executed. Those skilled in the art will appreciate that the components shown in FIG. 5 may be altered in a variety of ways. For example, certain components may be merged or divided; certain components may be omitted; certain components may be added, such as, for example, a compiler; and so on.

In some embodiments, the functions 515-540 provided by the DMP component 510 are responsible for passing or advancing a token deterministically between the threads of the multithreaded application, thereby deterministically controlling the forward progress of each thread. In some embodiments, this is accomplished by using a thread data structure 600. FIG. 6 is a high-level block diagram showing a thread data structure 600 used by the facility to make multiprocessor code deterministic in one or more embodiments. In some embodiments, the thread data structure 600 includes a thread container 605. The thread container stores a thread ID for each thread that is created by the multithreaded application during execution. The thread container 605 may be implemented as an array, a linked list, a queue or other data structure of thread IDs.

In some embodiments, the thread data structure 600 includes a token 610 that is used to control the ordering of execution of transaction or controlled operations by threads of the multithreaded application during execution. For example, in some embodiments, prior to executing a controlled operation or committing a transaction, a thread determines whether its thread ID matches the current value of the token 610. When the current value of the token 610 matches a thread's ID, a corresponding thread may execute the controlled operation or attempt to commit the transaction. Otherwise, the corresponding thread waits until the current value of the token 610 matches its thread ID.

In some embodiments, the order in which threads are created corresponds to the order in which the threads are deterministically executed. For example, as each thread is created, the thread's corresponding thread ID may be sequentially stored in the thread container 605. As transactions or controlled operations are executed, the executing thread invokes certain DMP functions, such as DMP_Commit( ) 535, which operate to advance the value of the token 610 by sequentially looping through the thread IDs stored in the thread container 605 based on the sequence in which the thread IDs were stored (beginning with the first thread ID). It is noted that, when a thread exits, the thread's corresponding ID is removed from the thread container 605.

In some embodiments, the thread data structure stores a commit block size 615. The commit block size 615 represents a predetermined number of transactions or controlled operations that may be executed by a thread whose thread ID matches the current value of the token 610 before the token is advanced. The commit block size 615 may range from 1 transaction or controlled operation to N transactions or controlled operations. In at least one embodiment, the commit block size 615 is equal to one thousand (1,000). In some embodiment, the commit block size 615 is configurable. For example, the commit block size 615 may be configured by a software developer to programmatically manipulate and test the various thread interleaving of a multithreaded application. As another example, the commit block size 615 may be automatically configured based on the maximum number of threads that may be created by the multithreaded application and/or the number of processor or cores of the multiprocessing system on which the multithreaded application executes.

Those skilled in the art will appreciate that a variety of techniques may be used to count the number of controlled operations executed by a thread. In some embodiments, the thread data structure 600 includes a thread commit block 620. The thread commit block 620 may represent the number of controlled operations that have been executed by a thread whose thread ID matches the current token ID 610. Each time the thread performs a controlled operation, the value of the thread commit block 620 is incremented, and the compared to the commit block size 615. If the value of the thread commit block 620 equals the commit block size 615, then the token 605 is advanced to the next thread ID, and the value of the thread commit block 620 is reset to zero. As an alternative example, the thread commit block 620 may represent the number of blocks that remain before a thread attempts to commit its corresponding transaction. In such embodiments, the thread commit block 620 may include a number of remaining blocks for each thread having a thread ID stored in the thread container 605. Then, each time a thread performs a block, the thread decrements its corresponding thread commit block and, when the number of remaining blocks equals zero, the thread attempts to commit its transaction.

In some embodiments, the thread data structure includes a threads-in-use block 625, which represents the number of threads executing in a multithreaded application. In some embodiments, the threads-in-use block 625 is incremented each time a thread is created. Similarly, the threads-in-use block 625 is decremented each time a thread exits. While in other embodiments, the threads-in-use block 625 is determined based on the size of the thread container 605. Those skilled in the art will appreciate that the thread data structure 600 shown in FIG. 6 may be altered in a variety of ways. For example, certain parts may be merged or divided; certain parts may be omitted; certain parts may be added; and so on.

Figure 7:
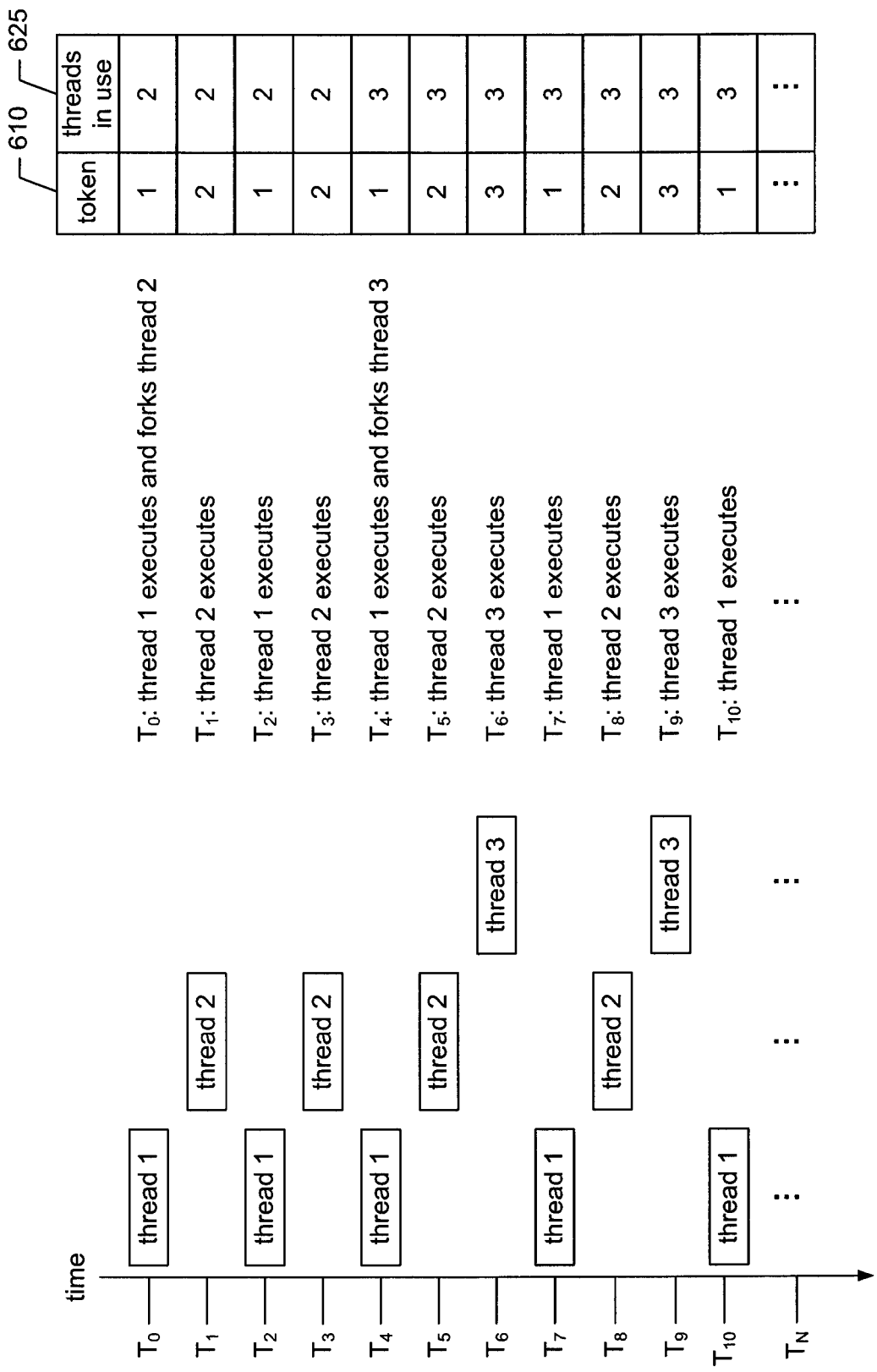
FIG. 7 is a high-level diagram showing an example of creating and deterministically executing threads in one or more embodiments.

FIG. 7 is a high-level diagram showing an example of creating and deterministically executing threads in one or more embodiments. To facilitate description, the contents of a portion of the thread data structure 600 are shown over time. As illustrated by the token value 610, the order in which threads are created corresponds to the order in which the threads are deterministically executed.

In the illustrated example, the first-created thread ("thread 1") represents the main application thread of the multithreaded application. To facilitate description, the thread ID of each thread is equal to the order in which the thread was created. That is, the thread ID of the first-created thread is 1; the thread ID of the second-created thread is 2; the thread ID of the third-created thread is 3; and so on. Between time $T_0$ and $T_1$, thread 1 executes and thread 2 is created. In the illustrated example, a thread's execution is represented by a specified number of controlled operations (e.g., a quantum specified by commit block size 615). Thus, the time increments illustrated in FIG. 7 are not necessarily equal. It is also noted that the number of uncontrolled operations executed by each thread may be different, and may differ for each thread during each of its execution periods.

Returning to FIG. 7, because thread 2 was created at some point before thread 1 completed its quantum execution, the number of thread-in-use 625 between time $T_0$ and $T_1$ is two. As a result, when thread 1 completed, the token 610 was advanced to the next thread ID stored in the thread container 605 (i.e., thread 2).

Between time $T_1$ and $T_2$, thread 2 executes, and then the token 610 is advanced back to thread 1. Between time $T_2$ and $T_3$, thread 1 executes, and then the token 610 is advanced to thread 2. Between time $T_3$ and $T_4$, thread 2 executes, and then the token 610 is advanced back to thread 1.

Between time $T_4$ and $T_5$, thread 1 executes and thread 2 is created. Although thread 3 was created between time $T_4$ and $T_5$, thread 2 executes between time $T_5$ and $T_6$. This is because the order in which threads were created corresponds to the order in which the threads are executed. As a result, thread 2 executes between time $T_5$ and $T_6$, and then the token 610 is advanced to thread 3. Thread 3 then executes between time $T_6$ and $T_7$, and then the token 610 is advanced back to thread 1.

Figure 8:
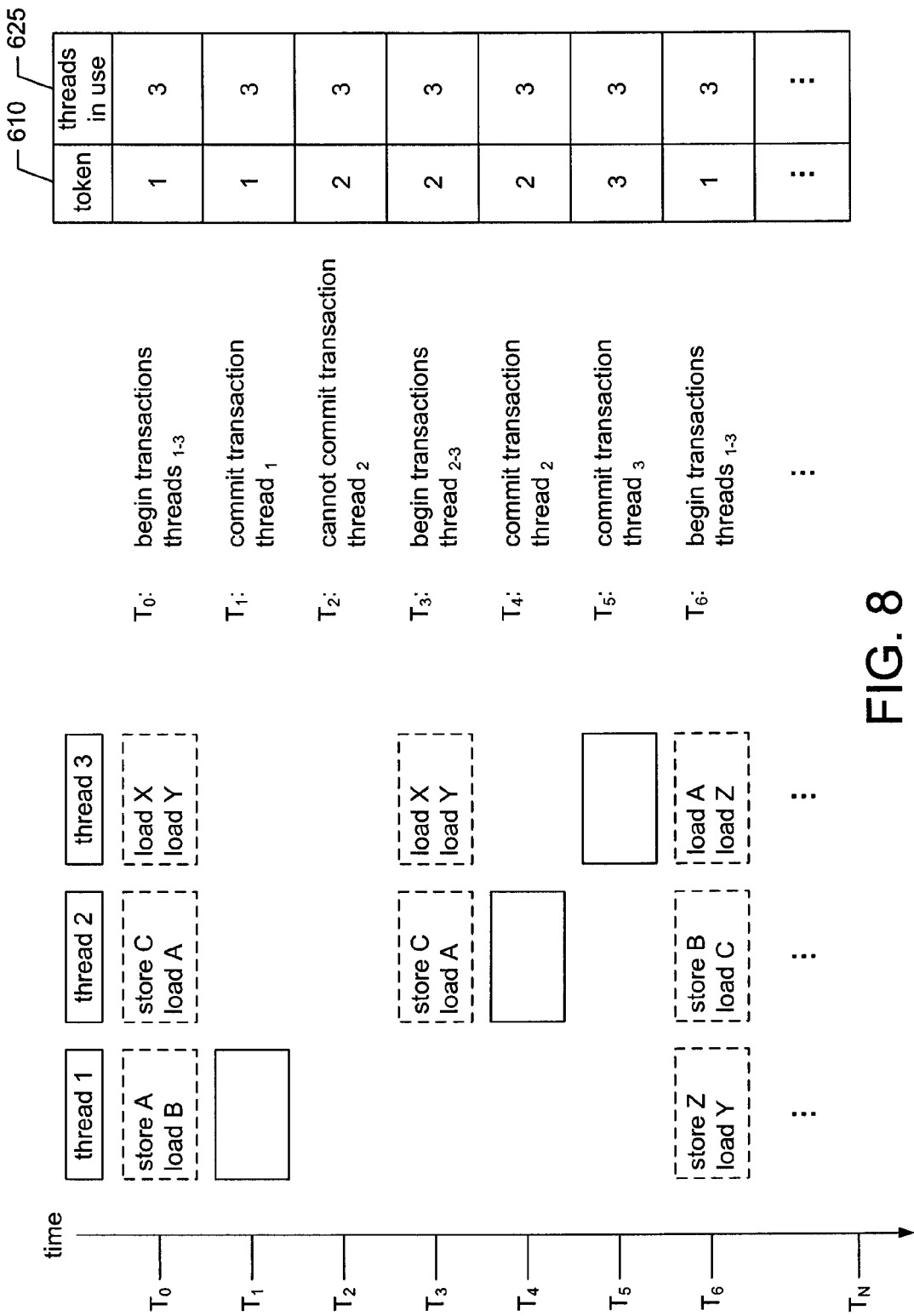
FIG. 8 is a high-level diagram showing an example of utilizing a transactional memory system to make multiprocessor code deterministic in one or more embodiments.

FIG. 8 is a high-level diagram showing an example of utilizing a transactional memory system to make multiprocessor code deterministic in one or more embodiments. To facilitate description, the contents of a portion of the thread data structure 600 are shown over time. Also, to facilitate description, it is assumed that the thread IDs are ordered in the thread container 605 as follows: thread 1, thread 2, thread 3. As illustrated by the token value 610 over time, the order in which threads commit transactions is deterministic. To facilitate description, the first value of the token 610 corresponds to the thread ID of thread 1. In the illustrated example, the transactions executed by each thread are deterministic in size. That is, each thread executes a specific number of blocks. To facilitate description, the commit block size 615 is two.

As illustrated, at time $T_0$, threads 1-3 begin a transaction. After a thread completes its corresponding transaction, the thread attempts to deterministically commit its transaction. In some embodiments, each thread determines whether its transaction resulted in a conflict that would prevent the thread from committing its transaction. While in other embodiment, this determination is made by a thread when its thread ID matches the current value of the token 610. For example, this may be accomplished by calling STMValidTransaction( ).

At time $T_1$, the current value of token 610 matches the ID of thread 1. Thus, in the illustrated example, thread 1 determines whether its transaction resulted in a conflict that would prevent it from committing the transaction. Because transactions are committed according to a specified deterministic order, the facility is able to use memory renaming to avoid aborting transactions as a result of write-after-write and write-after-read conflicts. That is, because operations within a transaction are buffered before the transaction is committed, the facility is able to determine whether a write-after-write or a write-after-read operations actually conflict, rather than aborting both transactions. In the illustrated example, although thread 1 and thread 2 accessed the same shared memory location (i.e., address A), which would result in a write-after-read conflict in a conventional transaction memory system, the transaction of thread 1 is valid. This is because thread 1 stored a value at address A and the token 610 matched its thread ID. That is, the store of A (performed by thread 1) is not affected by the load of A (performed by thread 2). As a result, thread 1 commits its transaction (e.g., by calling STMCommitTransaction( )), and then the token 610 is advanced to the next thread ID. However, if the token 610 had matched the thread ID of thread 2, then thread 1 would abort its transaction. This is because thread 2 may have loaded A after thread 1 stored A. Assuming that the token 610 matched the ID of thread 2, then both thread 1 and thread 2 would abort their transactions. In which case, thread 2 would begin and commit the aborted transaction prior to restarting the aborted transaction of thread 1.

As illustrated, at time $T_1$, thread 1 commits it transaction, and then the token 610 is advanced to thread 2. However, thread 2 cannot commit its transaction because thread 2 loaded a value that was stored by thread 1 during the same transaction. That is, thread 2 may have loaded A prior to thread 1 storing A. As a result, thread 2 must abort its transaction and restart. In the illustrated example, all threads having thread IDs subsequent to an aborted thread are aborted. While in other embodiments only those threads having subsequent IDs whose concurrent transactions accessed the same shared resource are aborted and restarted. Thus, in the illustrated example, the transaction of thread 3 is aborted and restarted. However, in other embodiments, the transaction of thread 3 would not be aborted because its transaction did not access a shared resource that was accessed by thread 2 or thread 1 during the concurrent transaction. Instead, thread 3 would simply wait for the token 610 to match its thread ID. It is noted that the token 610 is not advanced until the thread whose thread ID matches the token successfully commits its corresponding transaction.

As illustrated, at time $T_3$, threads 2-3 restart their aborted transactions. At time $T_4$, the current value of token 610 matches the ID of thread 2, so thread 2 determines whether its restarted transaction resulted in a conflict that would prevent it from committing the transaction. In the illustrated example, the restarted transactions of threads 2 and 3 do not access any shared memory locations. As a result, at time $T_4$, thread 2 successfully commits it transaction, and then the token 610 is advanced to thread 3. At time $T_5$, thread 3 successfully commits its transaction, and then the token 610 is advanced back to thread 1.

Next, at time $T_6$, threads 1-3 begin a transaction, and the process continues as described above. It is noted that, at time $T_6$, the concurrent transactions of threads 1 and 3 will result in thread 3 aborting and restarting its transaction. However, threads 1 and 2 will deterministically commit, and the token 610 will be advanced to thread 3, as described above.

Figure 21:
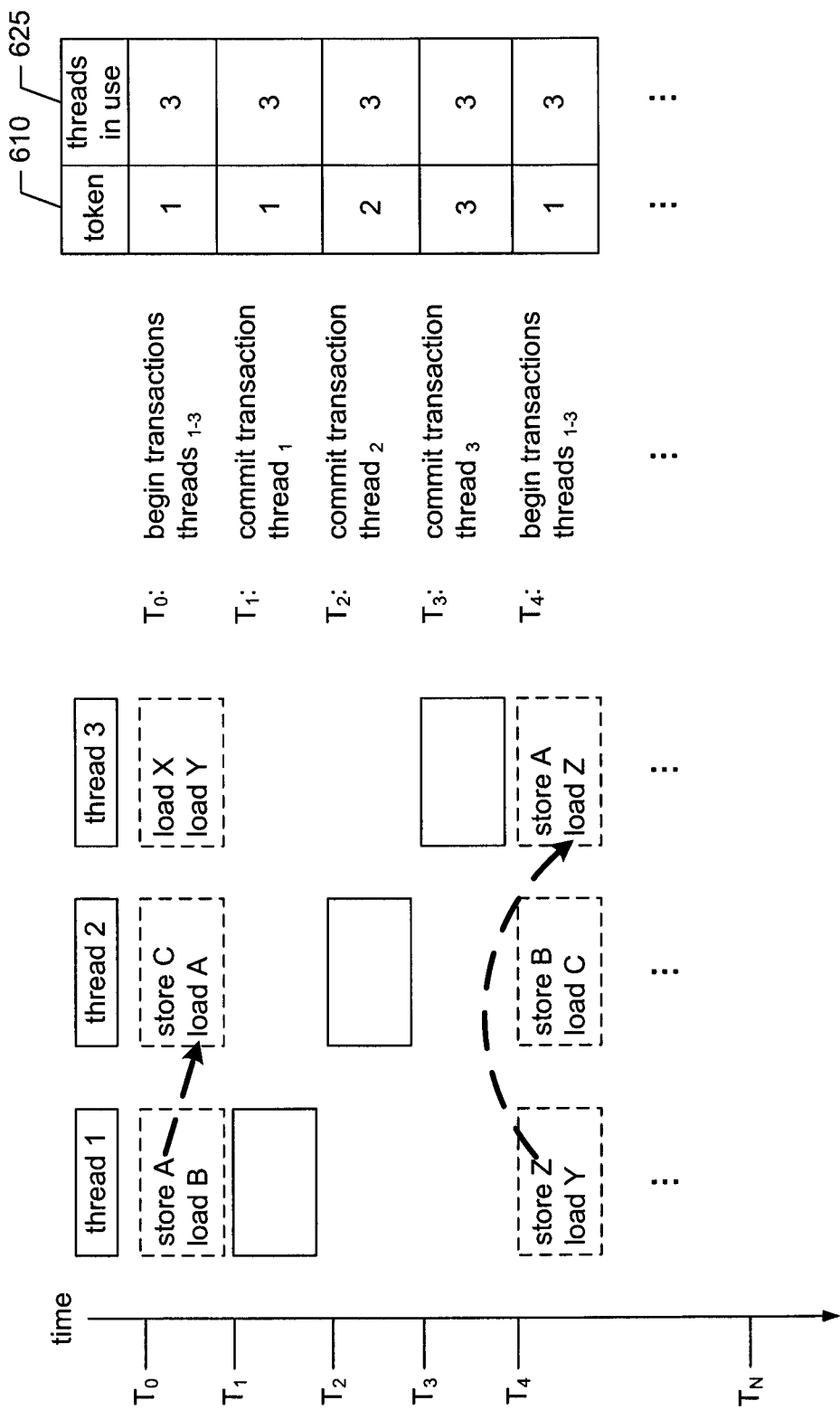
FIG. 21 is a high-level diagram showing an example of transactional memory forwarding in one or more embodiments.

In some embodiments, uncommitted ("speculative") data is forwarded between threads, thereby reducing the number of aborted transactions and recovering more parallelism within a multithreaded application. For example, FIG. 21 is a high-level diagram showing an example of transactional memory (TM) forwarding in one or more embodiments. To facilitate description, the contents of a portion of the thread data structure 600 are shown over time. Also, to facilitate description, it is assumed that the thread IDs are ordered in the thread container 605 as follows: thread 1, thread 2, thread 3. As illustrated by the token value 610 over time, the order in which threads commit transactions is deterministic. To facilitate description, the first value of the token 610 corresponds to the thread ID of thread 1.

When TM forwarding is enabled and a thread (referred to as an "updater" thread) issues a memory operation to write to a memory location regarded as shared or private to another thread, the updater thread broadcasts a message indicating that the data stored at the memory location has been updated. In response to the broadcast, each thread with an outdated copy of the data removes the outdated data from its cache. In some embodiment, if another thread (referred to as a "calling" thread) subsequently issues a memory operation to read the shared memory location, an updated copy of the data is forwarded to the calling thread instead of aborting the transaction, provided that the updater thread precedes the calling thread in the deterministic order. For example, in the illustrated embodiment, at time $T_0$, threads 1-3 begin a transaction. Thread 1 issues a memory operation to write to memory location A and broadcasts a message indicating that the data stored at memory location A has been updated. To facilitate description, it is assumed that thread 2 previously cached the data stored at memory location A. When thread 2 receives the broadcast from thread 1, thread 2 removes the outdated copy of the data from its cache. Thread 2 subsequently issues a memory operation to read memory location A. Because the data is no longer cached, thread 2 determines whether the memory location A has been updated and, if so, whether it was updated by a thread preceding it in the deterministic order. In this example, because thread 1 precedes thread 2 in the deterministic order, an updated copy of the data to be stored at memory location A by thread 1 is forwarded to thread 2. The data forwarded to thread 2 is speculative because thread 1 has not committed its transaction at the time the data is received by thread 2. In some embodiments, if speculative data is forwarded from a uncommitted transaction that is ultimately aborted, then all threads that consumed the speculative data are also aborted. That is, if thread 1 aborts its transaction, thread 2 will abort its transaction as well because it consumed speculative data from thread 1.

After threads 1-3 complete their corresponding transaction, each thread attempts to commit its transaction. At time $T_1$, the current value of the token 610 matches the ID of thread 1 and no conflict exists that would prevent thread 1 from committing its transaction. Thus, thread 1 commits its transaction at time $T_1$, and then the token 610 is advanced to the next thread ID in the deterministic order (i.e., thread 2). At time T$_2$, the current value of the token 610 matches the ID of thread 2 and no conflict exists that would prevent thread 2 from committing its transaction. That is, because thread 1 successfully committed the transaction from which speculative data was previously forwarded to thread 2, no conflict exists to prevent thread 2 from committing its transaction. Thus, at time T$_2$, thread 2 commits its transaction and the token 610 is advanced to the next thread ID in the deterministic order (i.e., thread 3). At time T$_3$, the current value of the token 610 matches the ID of thread 3 and no conflict exists that would prevent thread 3 from committing its transaction. As a result, thread 3 commits its transaction at time T$_3$ and the token 610 is advanced to the next thread ID in the deterministic order (i.e., thread 1). Next, at time T$_4$, threads 1-3 begin a transaction, and the process continues as described above.

Figure 22:
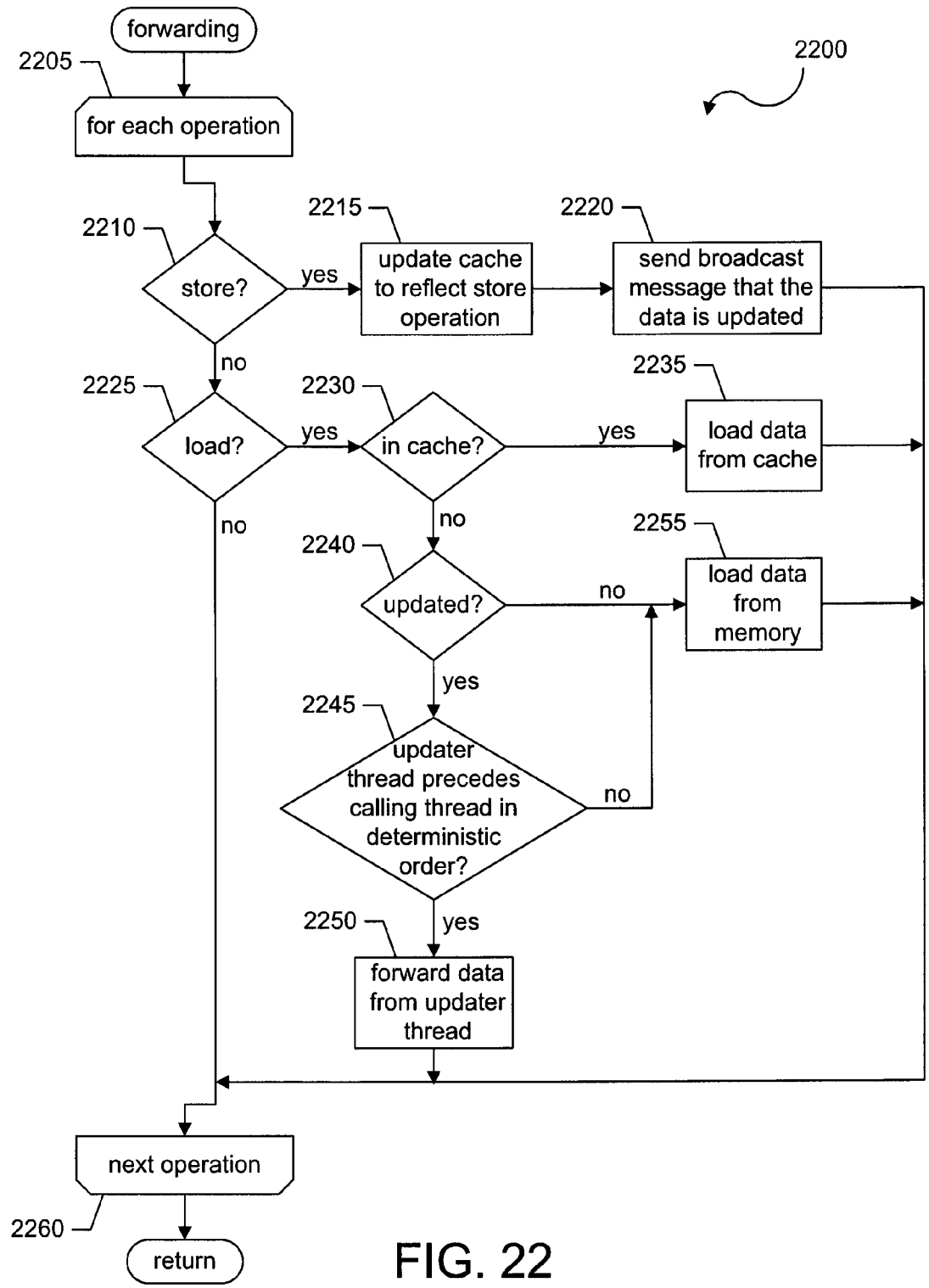
FIG. 22 is a flow diagram showing a transactional memory forwarding process performed by the facility in one or more embodiments.

FIG. 22 is a flow diagram showing a transactional memory forwarding process 2200 performed by the facility in one or more embodiments. It is noted that the transactional memory system may be a hardware transactional memory (HTM) system, a software transactional memory (STM) system, or a hybrid hardware-software transactional memory system (HS-TM). In steps 2205-2260, the facility loops through each operation within a transaction of a calling thread. In step 2205, the facility selects an operation. In step 2210, if the selected operation is a store operation, then the facility continues to step 2215, else the facility continues to step 2225.

In step 2215, the facility updates the cache of the calling thread to reflect the store operation. In step 2220, the facility sends a broadcast message indicating that the data stored at the memory location specified by the store operation has been updated, and then continues to step 2260. In step 2260, if additional operations within the transaction remain, then the facility continues to step 2205, else the process 2200 returns. In some embodiments, when such broadcast message is received, the facility determines for each thread whether the thread has accessed the updated memory location during the current transaction. If a thread has not accessed the memory location during the current transaction, then the message is disregarded for the thread. Otherwise, if a thread has accessed the memory location during the current transaction, then facility determines whether the thread precedes the updater thread in the deterministic order. If a thread precedes the updater thread in the deterministic order, then the message is disregarded for the thread. Otherwise, if a thread does not precede the updater thread in the deterministic order, the facility aborts the transaction executed by that thread.

In step 2225, if the operation is a load operation, then the facility continues to step 2230, else the facility continues to step 2260. In step 2230, if the memory location specified by the load operation is cached by the calling thread, then the facility continues to step 2235, else the facility continues to step 2240. In step 2235, the facility loads the data from the cache of the calling thread, then continues to step 2260. In step 2240, if the memory location has been updated during the transaction by another thread (referred to as the "updater thread"), then the facility continues to step 2245, else the facility continues to step 2255.

In step 2245, if the updater thread precedes the calling thread in the deterministic order, then the facility continues to step 2250, else the facility continues to step 2255. In step 2250, the facility forwards the data stored at the memory location specified by the load operation to the calling thread from the cache of the updater thread, then the facility continues to step 2260. In step 2255, the facility loads the data stored at the memory location specified by the load operation from memory, then continues to step 2260. In step 2260, if additional operations within the transaction remain, then the facility continues to step 2205, else the process 2200 returns.

Figure 9:
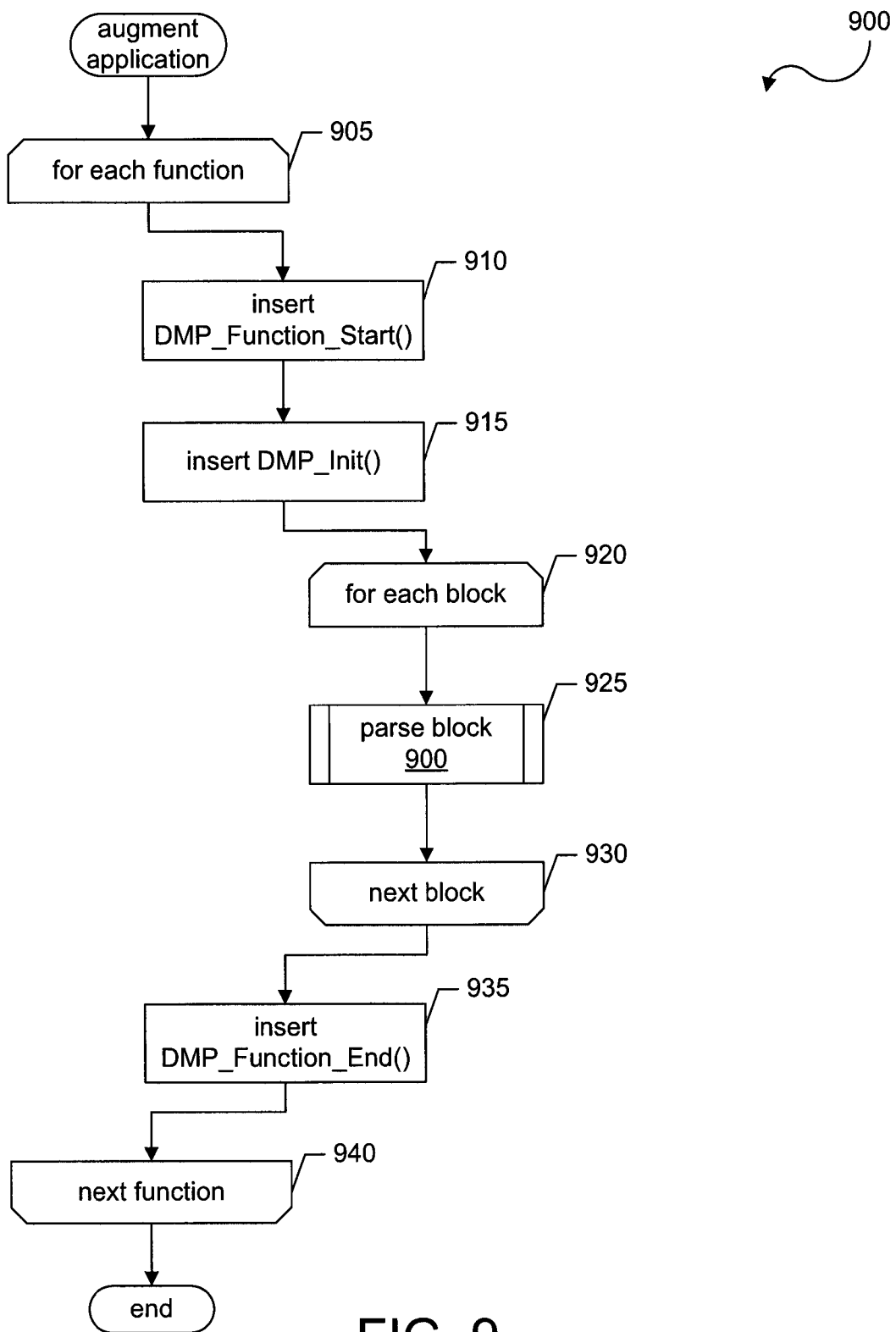
FIG. 9 is a flow diagram showing a process performed by the facility to augment an application in one or more embodiments.

FIG. 9 is a flow diagram showing a process 900 performed by the facility to augment multithreaded application code in one or more embodiments. In steps 905-940, the facility loops through each function of the multithreaded application code 545. In step 905, the facility selects a function, and then the facility continues to step 910. In step 910, the facility inserts a deterministic multiprocessing start-up function, such as DMP_Function_Start( ) function 515, and then the facility continues to step 915. At step 915 the facility inserts a deterministic multiprocessing initialization function, such as DMP_Init( ) function 520, and then the facility continues to step 920. In steps 920-930, the facility loops through each block of the selected application. In step 920, the facility selects a block, and then the facility continues to step 925. In step 925, the facility calls a parse block function 1000, and then the facility continues to step 930. In step 930, if additional blocks remain, then the facility continues to step 920, else the facility continues to step 935. In step 935, the facility inserts a deterministic processing end function, such as DMP_Function_End( ) 540, and then the facility continues to step 940. In step 940, if additional functions remain, the facility continues to step 905, else these steps end.

Figure 10:
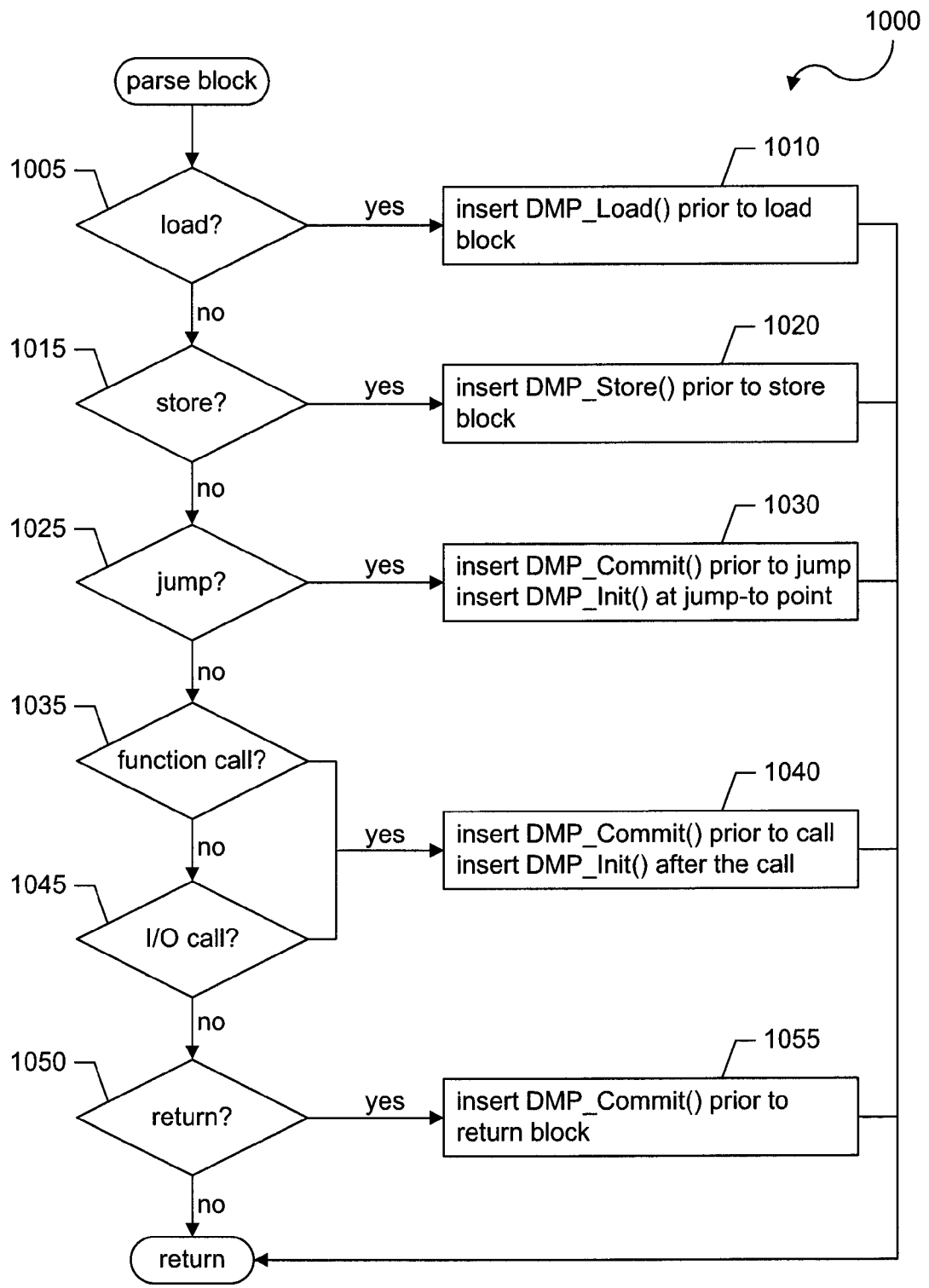
FIG. 10 is a flow diagram showing a process performed by the facility to parse a block in one or more embodiments.

FIG. 10 is a flow diagram showing a process 1000 performed by the facility to parse a block in one or more embodiments. In step 1005, if the facility determines that the block is a load block, then the facility continues to step 1010, else the facility continue to step 1015. In step 1010, the facility inserts a call to DMP_Load( ) function 530 prior to the load block, then the facility returns. In step 1015, if the facility determines that the block is a store block, then the facility continues to step 1020, else the facility continues to step 1025. In step 1020, the facility inserts a call to DMP_Store( ) function 525 prior to the store block, then the facility returns. In step 1025, if the facility determines that the block is a jump block, then the facility continues to step 1030, else the facility continues to step 1035. In step 1030, the facility inserts a call to DMP_Commit( ) function 535 prior to the jump and inserts a call to DMP_Init( ) function 520 at the jump-to point, then the facility returns. In step 1035, if the facility determines that the block is a function call, then the facility continues to step 1040, else the facility continues to step 1045. In step 1040, the facility inserts a call to DMP_Commit( ) function 535 prior to the call and inserts a call to DMP_Init( ) 520 after the call, then the facility returns. In step 1045, if the facility determines that the block is an I/O call, then the facility continues to step 1040 as described above, else the facility continues to step 1050. In step 1050, if the facility determines that the block is a return block, then the facility continue to step 1055, else the facility returns. In step 1055, the facility inserts a call to DMP_Commit( ) 535 prior to the return block, then the facility returns.

FIG. 11 is an example of a control flow graph 1100 of an augmented function of a multithread application in one or more embodiments. The term "control flow graph" refers to a representation of all paths that might be traversed through an application during its execution. Each node 1105-1130 in the graph 1100 represents a basic block, i.e. a straight-line piece of code without any jumps or jump targets. Jump targets start a block, and jumps end a block. For example, block 1110, which represents the DMP_Init( ) function 520 is a jump target. Block 1105 represents the entry block, through which all control enters into the flow graph. Block 1130 represents the exit block, through which all control flow leaves. Directed edges, such as, for example, the edge between block 1115 and 1125, the edge between 1120 and 1125, and the edges between block 1110 and blocks 1115, 1120, and 1125 are used to represent jumps in the control flow.

Figure 12:
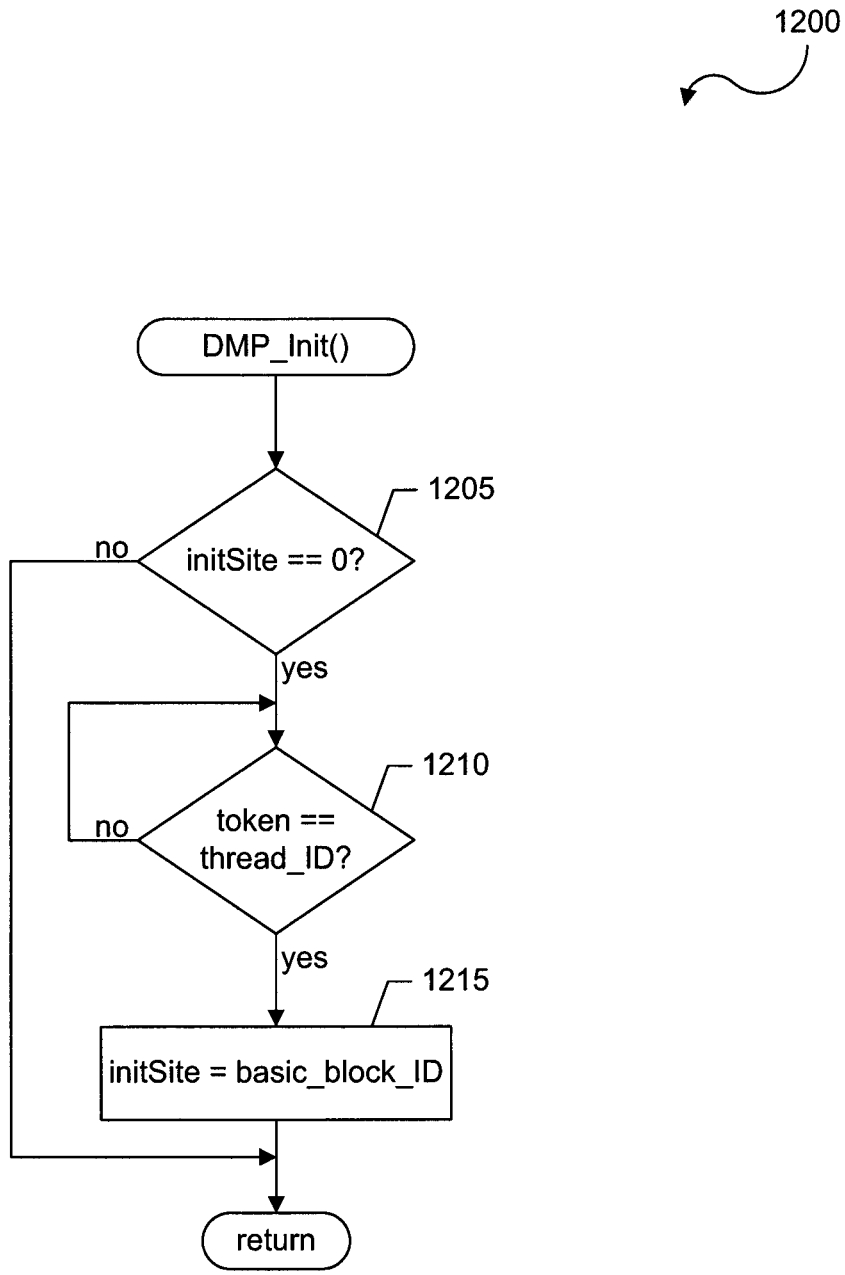
FIG. 12 is a flow diagram showing a deterministic multiprocessing initialization function in one or more embodiments.

FIG. 12 is a flow diagram showing a deterministic multi-processing ("DMP") initialization function 1200 in one or more embodiments. For example, the DMP initialization function 1200 may be performed when the facility operates together with a transactional memory system. The DMP initialization function may be performed to determine whether a thread is in an initialized state, such that the thread may begin or continue processing a transaction. If a thread is not initialized (i.e., the value of the thread's initSite variable equals zero), its execution is suspended until the value of the token matches the thread's ID. If a thread is initialized, the thread continues executing.

In step 1205, if the facility determines that the value of a thread's initiation variable ("initSite") is equal to zero, then the facility continues to step 1210, else the facility returns. A thread's initialization variable may be assigned to zero, for example, after a thread successfully commits a transaction. In step 1210, if the facility determines that the current value of the token matches the thread's ID, then the facility continues to step 1215, else the facility loops back to step 1210. That is, the facility suspends the thread execution in step 1210 until the thread's ID matches the value of the token. In step 1215, the facility assigns the initSite variable to the memory address at which the thread begins a transaction, then the facility returns. The initSite variable may then be used as an explicit jump address if the transaction cannot be committed.

Figure 13:
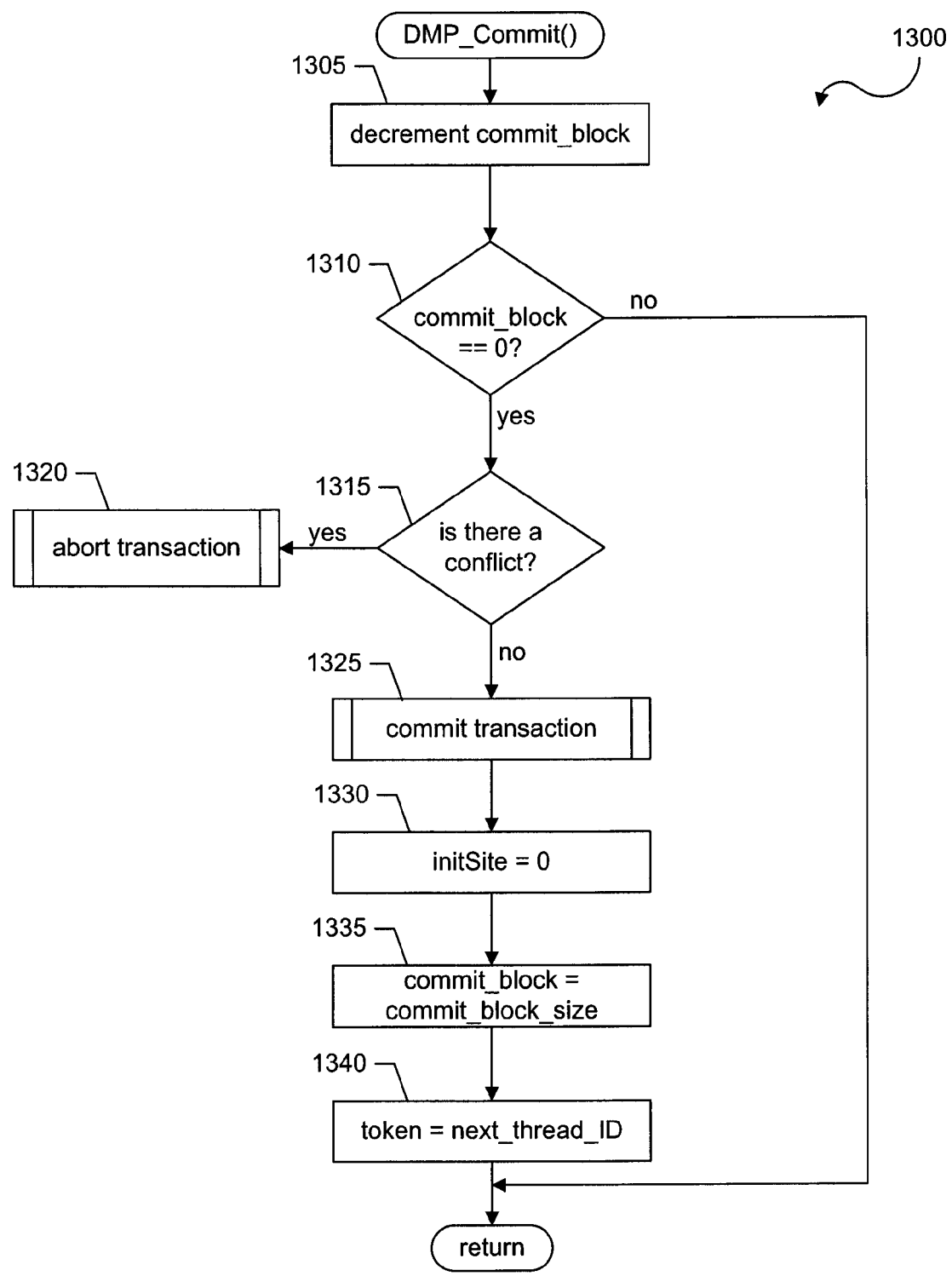
FIG. 13 is a flow diagram showing a deterministic multiprocessing commit function in one or more embodiments.

FIG. 13 is a flow diagram showing a deterministic multi-processing ("DMP") commit function 1300 in one or more embodiments. For example, the DMP commit function 1300 may be performed when the facility operates together with a transactional memory system. In step 1305, the facility decrements the value of the commit block variable, then the facility continue to step 1310. The commit block variable is used to count the number of operations performed by a thread. In step 1310, if the facility determines that the value of the commit block variable is zero, then the facility continues to step 1315, else the facility returns. In step 1315, if the facility determines that there was a conflict between (for example, because the thread read from a location written by another thread during the transaction), then the facility continues to step 1320, else the facility continues to step 1325. In step 1320, the facility aborts the transaction. In step 1325, facility commits the transaction, then the facility continues to step 1330. In step 1330, the facility assigns the value of the thread's initSite variable to zero, then the facility continues to step 1335. In step 1335, the facility resets the value of the commit block variable of the thread by assigning the value of the commit block variable to the commit block size, then the facility continues to step 1340. In step 1340, the facility advances the token by assigning the value of the token to the value of the next thread ID, then the facility returns.

Thus, a facility for deterministic multiprocessing of multithreaded applications has been described. Although the facility has been described with reference to specific embodiments, it will be recognized that the facility is not limited to the embodiments described, but can be practiced with modification and alteration within the spirit and scope of the appended claims. Accordingly, the specification and drawings are to be regarded in an illustrative sense rather than a restrictive sense.

We claim:

1. A multiprocessing system for controlling the interleaving of threads of a multithreaded application on a critical path of the multithreaded application, the system comprising:
    at least one processor and memory;
    multithreaded application code specifying a plurality of threads;
    a quantum builder component, executing on the at least one processor and using the memory, to divide the multithreaded application code into two or more quanta, each quantum constituting a predetermined number of operations to be executed by a thread in the plurality of threads;
    a deterministic execution component to specify an order in which to execute the two or more quanta by the plurality of threads each time the multithreaded application code executes with a particular input by automatically augmenting the multithreaded application code with synchronization code;
    an adaptive quantum builder component to monitor thread executions and determine for each of the two or more quanta whether to invoke the synchronization code prior to executing its predetermined number of operations; and
    a quantum completion component to monitor thread executions and, for each of the two or more quanta, if the synchronization code is not invoked by the adaptive quantum builder component, to invoke the synchronization code to suspend or to abort execution of the quantum in response to the quantum's thread executing its predetermined number of operations so that the order of execution of the two or more quanta follows the critical path of the multithreaded application and wherein, when a particular input is specified for multiple executions passes of the multithreaded application code, each execution pass produces the same output for the particular input.

2. The multiprocessing system of claim 1 wherein the adaptive quantum builder component monitors thread executions for a change to an application-level synchronization primitive.

3. The multiprocessing system of claim 2 wherein the change to the application-level synchronization primitive is a release of a lock.

4. The multiprocessing system of claim 3 wherein, when the lock is released, the adaptive quantum builder component ends the quantum.

5. The multiprocessing system of claim 1 wherein the adaptive quantum builder component monitors access to shared memory by the plurality of threads.

6. The multiprocessing system of claim 1 wherein the adaptive quantum builder component monitors thread executions by inserting code within the multithreaded application code.

7. The multiprocessing system of claim 6 wherein the inserted code includes a sharing table for track memory operations.

8. The multiprocessing system of claim 1 wherein the deterministic execution component implements a token that is used to specify the order and wherein the adaptive quantum builder component monitors thread execution of a thread specified by the token.

9. The multiprocessing system of claim 1 wherein the quantum builder component, the deterministic execution component, the adaptive quantum builder component, and the quantum completion component are implemented exclusively in hardware.

10. The multiprocessing system of claim 1 wherein the quantum builder component, the deterministic execution component, the adaptive quantum builder component, and the quantum completion component are implemented exclusively in software.

11. The multiprocessing system of claim 1 wherein the quantum builder component, the deterministic execution component, the adaptive quantum builder component, and the quantum completion component are implemented using a combination of hardware and software.

12. A method in a multiprocessing system for controlling an order of memory operations executed by threads of a multithreaded application, the method comprising:
   executing multithreaded application code on a multiprocessing system, the multithreaded application code specifying a plurality of threads;
   dividing the multithreaded application code into two or more quanta, each quantum constituting a predetermined number of operations that include memory operations to be executed by a thread in the plurality of threads;
   specifying, by automatically augmenting the multithreaded application code with synchronization code, an order in which the plurality of threads execute the two or more quanta each time the multithreaded application code is executed with a particular input, wherein, when the multithreaded application code is executed, inter-thread communications specifying memory operations are executed in the specified order;
   monitoring thread executions;
   for each of the two or more quanta, determining, based on the monitored thread executions, whether to suspend or abort the execution of the quantum and;
   if it is determined to suspend or abort the execution of the quantum, invoking the synchronization code to suspend or to abort execution of the quantum prior to the quantum's thread executing its predetermined number of operations so that the order of execution of the two or more quanta follows a critical path of the multithreaded application and wherein, when a particular input is specified for multiple executions passes of the multithreaded application code, each execution pass produces the same output for the particular input.

13. The method of claim 12 wherein the order in which the plurality of threads execute the two or more quanta is specified by a token such that, when the token matches an identifier of a thread, the thread executes a quantum.

14. The method of claim 13 wherein monitoring thread executions includes:
   tracking a number of accesses to private data issued by the thread whose identifier matches the token; and
   suspending or aborting the execution of the quantum prior to the execution of the predetermined number of operations when the number of accesses to private data issued by the thread exceed a predefined number.

15. The method of claim 13 wherein monitoring thread executions includes:
   receiving an indication that an application-level synchronization primitive is released by the thread whose identifier matches the token; and
   ending the quantum prior to execution of the predetermined number of operations in response to the release of the application-level synchronization primitive.

16. The method of claim 12 wherein monitoring thread executions includes inserting synchronization code within the multithreaded application code.

17. A computer-readable system memory storing code that is capable of causing a multiprocessing system to control the order of memory operations executed by threads of a multithreaded application, the code comprising:
   code to execute multithreaded application code on a multiprocessing system, the multithreaded application code specifying a plurality of threads;
   code to divide the multithreaded application code into two or more quanta, each quantum constituting a predetermined number of operations that include memory operations to be executed by a thread in the plurality of threads;
   code to specify, by automatically augmenting the multithreaded application code with synchronization code, an order in which the plurality of threads execute the two or more quanta each time the multithreaded application code is executed with a particular input, wherein, when the multithreaded application code is executed, inter-thread communications specifying memory operations are executed in the specified order;
   code to monitor thread executions;
   code to, for each of the two or more quanta, determine, based on the monitored thread executions, whether to suspend or abort the execution of the quantum and;
   code to, if it is determined to suspend or abort the execution of the quantum, invoke the synchronization code to suspend or to abort execution of the quantum prior to the quantum's thread executing its predetermined number of operations so that the order of execution of the two or more quanta follows a critical path of the multithreaded application and wherein, when a particular input is specified for multiple executions passes of the multithreaded application code, each execution pass produces the same output for the particular input.

18. A method in a multiprocessing system for recovering parallelism in a multithreaded application that are executed in a particular order, the method comprising:
   dividing a multithreaded application code specifying a plurality of threads into two or more quanta, each quantum constituting a predetermined number of operations to be executed by a thread in the plurality of threads;
   for each quantum to be executed by a thread, identifying any operations that access memory locations that are provably local to the thread;
   automatically inserting synchronization code within the multithreaded application code to specify an order in which the plurality of threads execute the two or more quanta each time the multithreaded application code is executed with a particular input, wherein the inserted synchronization code implements a shared-memory data structure for monitoring operations that access memory locations other than operations that access memory locations that are identified as provably local to the thread, wherein a memory location is identified as provably local to the thread by determining that no other threads in the plurality of threads will access the memory location during execution of the multithreaded application;
   executing the multithreaded application code; and
   when the thread issues an operation to access a memory location that is identified in the sharing table as private to another thread, suspending execution of the thread until each of the other threads in the plurality of threads has completed execution of the predetermined number of operations, is suspended, or is aborted, and the order specifies that the thread is to proceed with execution.

19. The method of claim 18 further comprising:
   when the thread issues an operation to access a memory location that is provably local to the thread, executing the operation regardless of the specified order.

20. The method of claim 18 wherein the shared memory data structure is implemented as a sharing table that identifies private and shared memory.

21. A computer-readable system memory storing code that is capable of causing a multiprocessing system to control order of memory operations executed by threads of a multithreaded application, the code comprising:
- code to divide a multithreaded application code specifying a plurality of threads into two or more quanta, each quantum constituting a predetermined number of operations to be executed by at least one thread in the plurality of threads;
- code to identify, for each quantum to be executed by a thread, any operations that access memory locations that are provably local to the thread;
- code to automatically insert synchronization code within the multithreaded application code to specify an order in which the plurality of threads execute the two or more quanta each time the multithreaded application code is executed with a particular input, wherein the inserted synchronization code implements a shared-memory data structure for monitoring operations that access memory locations other than operations that access memory locations that are identified as provably local to the thread, wherein a memory location is identified as provably local to the thread by determining that no other threads in the plurality of threads will access the memory location during execution of the multithreaded application;
- code to execute the multithreaded application code; and
- code to suspend, when the thread issues an operation to access a memory location that is identified in the sharing table as private to another thread, execution of the thread until each of the other threads in the plurality of threads has completed execution of the predetermined number of operations, is suspended, or is aborted, and the order specifies that the thread is to proceed with execution.

22. A multiprocessing system for controlling the interleaving of threads of a multithreaded application on a critical path of the multithreaded application, the system comprising:

- at least one processor and memory;
- multithreaded application code specifying a plurality of threads;
- a quantum builder component, executing on the at least one processor and using the memory, to divide the multithreaded application code into two or more quanta, each quantum constituting a predetermined number of operations to be executed by a thread in the plurality of threads;
- a deterministic execution component to specify an order in which to execute the two or more quanta by the plurality of threads each time the multithreaded application code executes with a particular input by automatically augmenting the multithreaded application code with synchronization code;
- an adaptive quantum builder component to monitor thread executions and thread access to shared memory, and to determine for each of the two or more quanta and in response to executing a threshold number of operations access memory other than memory designated as shared memory, to invoke the synchronization code to suspend or abort the execution of the quantum; and
- a quantum completion component to monitor thread executions and, if the synchronization code is not invoked by the adaptive quantum builder component, to invoke the synchronization code to suspend or abort the execution of the quantum in response to the quantum's thread executing its predetermined number of operations so that the order of execution of the two or more quanta follows the critical path of the multithreaded application and wherein, when a particular input is specified for multiple executions passes of the multithreaded application code, each execution pass produces the same output for the particular input.

* * * * *

UNITED STATES PATENT AND TRADEMARK OFFICE
CERTIFICATE OF CORRECTION

| | | |
|---|---|---|
| PATENT NO. | : 8,739,163 B2 | Page 1 of 1 |
| APPLICATION NO. | : 12/402395 | |
| DATED | : May 27, 2014 | |
| INVENTOR(S) | : Luis Ceze et al. | |

It is certified that error appears in the above-identified patent and that said Letters Patent is hereby corrected as shown below:

On title page 2, in column 1, item (56) under "Other Publications", line 20, delete "Mulitprocessor,"" and insert -- Multiprocessor," --, therefor.

On title page 2, in column 1, item (56) under "Other Publications", line 30, delete ""Implicity" and insert -- "Implicitly --, therefor.

On title page 2, in column 2, item (56) under "Other Publications", line 7, delete ""Debuggin" and insert -- "Debugging --, therefor.

On title page 2, in column 2, item (56) under "Other Publications", line 23, delete "Impelmentation," and insert -- Implementation, --, therefor.

On title page 2, in column 2, item (56) under "Other Publications", line 54, delete "Progrmming" and insert -- Programming --, therefor.

In the Drawings:

On Sheet 17 of 25, in Figure 17, Reference Numeral 1730, line 5, after "within" delete "the".

In the Specification:

In column 1, line 30, delete "it" and insert -- its --, therefor.

In column 13, line 3, after "actually" insert -- or --.

Signed and Sealed this
Ninth Day of September, 2014

Michelle K. Lee
*Deputy Director of the United States Patent and Trademark Office*